United States Patent
Morris et al.

(10) Patent No.: US 6,652,096 B1
(45) Date of Patent: Nov. 25, 2003

(54) PROGRESSIVE LENS

(75) Inventors: Michael Alan Morris, Santa Rosa, CA (US); Saulius Raymond Varnas, Brighton (AU); Anthony Dennis Miller, Bellevue Heights (AU)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 09/980,091
(22) PCT Filed: May 31, 2000
(86) PCT No.: PCT/AU00/00620
§ 371 (c)(1), (2), (4) Date: Feb. 28, 2002
(87) PCT Pub. No.: WO00/73846
PCT Pub. Date: Dec. 7, 2000

(30) Foreign Application Priority Data
May 31, 1999 (AU) .............................. PQ 0655

(51) Int. Cl.⁷ ................................................ G02C 7/06
(52) U.S. Cl. ..................................................... 351/169
(58) Field of Search .................................. 351/169, 177

(56) References Cited

U.S. PATENT DOCUMENTS

| | | |
|---|---|---|
| 4,537,479 A | 8/1985 | Shinohara et al. |
| 4,762,408 A | 8/1988 | Shinohara |
| 4,778,266 A | 10/1988 | Maitenaz |
| 4,838,674 A | 6/1989 | Dufour |
| 4,934,808 A | 6/1990 | Kitani |
| RE34,132 E | 11/1992 | Kitani |
| 5,270,745 A | 12/1993 | Pedrono |
| 5,272,495 A | 12/1993 | Pedrono |
| 5,708,493 A | 1/1998 | Ahsbahs et al. |
| 5,867,246 A | 2/1999 | Edwards et al. |
| 6,074,062 A | 6/2000 | Morris et al. |
| 6,086,203 A | * 7/2000 | Blum et al. ............... 351/169 |
| 6,155,681 A | 12/2000 | Kris et al. |
| 6,199,984 B1 | 3/2001 | Menezes |

FOREIGN PATENT DOCUMENTS

| | | |
|---|---|---|
| WO | WO96/12984 | 5/1996 |
| WO | WO 97/38343 | 10/1997 |
| WO | WO 97/40415 | 10/1997 |
| WO | WO 99/13374 | 3/1999 |
| WO | WO 99/66366 | 12/1999 |

* cited by examiner

Primary Examiner—Scott J. Sugarman
(74) Attorney, Agent, or Firm—Burns, Doane, Swecker & Mathis, L.L.P.

(57) ABSTRACT

A series of progressive opthalmatic lens elements, each lens element including a lens surface having an upper viewing zone having a surface power to achieve a refracting power corresponding to distance vision; a lower viewing zone having a greater surface power than the upper viewing zone to achieve a refracting power corresponding to near vision; a corridor of relatively low surface astigmatism connecting the upper and lower zones, said corridor having a surface power varying from that of the upper viewing zone to that of the lower viewing zone; the progressive opthalmatic lens series including a first set of lens elements having a base curve(s) suitable for use in providing a range of distance prescriptions for a first category of patient; and a second set of lens elements having a base curve(s) suitable for use in providing a range of distance prescriptions for a second category of patient; each lens element within a set differing in prescribed addition power and including a progressive design, in at least one of the upper and lower viewing zones, depending upon the addition power of the lens element; the lens elements in the first set differing substantively in progressive design from the corresponding lens elements in the second set due to the differences in base curve(s).

40 Claims, 20 Drawing Sheets

PROGRESSIVE LENS

The present invention relates to a progressive opthalmatic lens and in particular to a progressive opthalmatic lens exhibiting reduced sensitivity to fitting errors, improved functionality and ease of adaptation, designed to more closely follow the natural eye movements of the wearer and taking into account wearer sensitivity to blur, and to a process for producing such lenses.

Numerous progressive lenses are known in the prior art. Progressive lenses have heretofore been designed on the basis that they have distance, near and intermediate viewing zones. The intermediate zone joins the near and distance zones in a cosmetically acceptable way, in the sense that no discontinuities in the lens should be visible to people observing the lens of the wearer. The design of the intermediate zone is based on a line called the "eye path" along which the optical power of the lens increases more or less uniformly.

Prior art progressive lenses do not address the depth of field factor, which defines wearer sensitivity to blur. They also did not attempt to tailor the blur gradients to wearer preferences.

A further disadvantage of prior art progressive lenses is that they are difficult to fit. Such lenses must be fitted to a carefully measured pupillary height relative to the lower frame edge, and to a carefully measured pupillary distance relative to the nasal frame edge. Errors of as little as 1 or 2 mm in either measurement can cause significant reduction in lens utility.

It would be a significant advance in the art if a progressive opthalmatic lens could be designed with reduced sensitivity to horizontal fitting errors (such as errors in pupillary distance measurement of the wearer) and vertical fitting height errors ascribed to frame and face conformation measurement errors. This would make such lenses more similar in ease of fitting to single vision reading lenses.

It would be a further significant advance in the art if the progressive lens could more closely relate to the requirements of the individual wearer and to the natural eye movements of a wearer in performing distance, intermediate and near tasks.

Accordingly, it is an object of the present invention to overcome, or at least alleviate, one or more of the difficulties and deficiencies related to the prior art. These and other objects and features of the present invention will be clear from the following disclosure.

Accordingly, in a first aspect of the present invention, there is provided a progressive opthalmatic lens element including a lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism; the corridor exhibiting a power progression from that of the upper viewing zone to that of the threshold of the lower viewing zone, the corridor and lower viewing zone exhibiting a power progression profile having at least two segments the slopes of which being related at least in part to the prescribed addition power and/or the depth of focus of the wearer.

It will be understood that the present invention permits the progressive lens design to be tailored to improve functionality and/or ease of adaptation, depending on the wearer's prescription.

It will be understood that the opthalmatic lens element according to the present invention may form one of a series of lens elements. The lens element series may be of the type described in International patent application PCT/EP97/00105, to applicants, the entire disclosure of which is incorporated herein by reference.

The present invention accordingly relates to a progressive opthalmatic lens series exhibiting improved functionality and ease of adaptation, as it takes into account factors including one or more of the following: wearers' sensitivity to blur, natural eye movements, preferences for the blur gradients across the boundaries of the peripheral zones. These factors may be dependent on the wearer's prescription.

Accordingly, in a further aspect of the present invention, there is provided a series of progressive opthalmatic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the progressive opthalmatic lens series including a first set of lens elements having at least one base curve suitable for use in providing a range of distance prescriptions for myopes, emmetropes or hyperopes, each lens element within a set differing in prescribed addition power and including a progressive design, the corridor and lower viewing zone exhibiting a power progression profile having at least two segments the slopes of which are related to the prescribed addition power and/or depth of focus of the wearer;

each lens element within a set having an addition power of from approximately 0.75 D to 1.50 D, exhibiting a relatively shallow power progression in the first segment and a relatively steep power progression in the second segment; and having an addition power of from approximately 1.75 D to 3.00 D, exhibiting a relatively steep power progression in the first segment and a relatively shallow power progression in the second segment.

The opthalmatic lens element, at low addition powers, for example from approximately 0.75 D to 1.50 D, where accommodation reserve is relatively high, may exhibit a relatively shallow power progression within the upper part of the corridor; and a relatively steep power progression from the lower part of the corridor to the near measurement point (NMP). This makes a functionally better progressive lens for those wearers that do not have much need for addition power when viewing objects at intermediate distances. They have sufficient amount of accommodation to be able to view most objects at intermediate distances through the distance zone of the lens.

The opthalmatic lens element, at high addition powers, for example from approximately 1.75 D to 3.00 D, may exhibit a relatively steep power progression within the upper part of the corridor; and a relatively shallow power progression from the lower part of the corridor to the near vision measurement point.

It will be understood that the provision of, for example, a relatively steep power progression within the upper part corridor of the opthalmatic lens element provides an increased level of freedom in lens design within the lower or near viewing zone, thus permitting an improvement in optical quality within the zone. This is very important for high add wearers that are likely to lead a more sedentary lifestyle and have high demands on the near vision performance of their spectacles.

It will be further understood that the opthalmatic lens element according to this aspect of the present invention exhibits a power progression profile which is divided into at least two segments. The slopes of the segments are related to the addition power, accommodation reserve, and the depth of focus of the wearer.

The two segments may exhibit a length ratio, for example, of approximately 2:1): fitting cross (FC) to the "highest reading point" (HRP) and the tail between the HRP and the full addition power at the near vision measurement point (NMP).

The first segment may be characterised by a steep rise of power making the effective length of the corridor very short, for example approximately 11 mm, for addition powers up to approximately 2.50 D and increasing slightly with increased addition power thereabove, while in the second segment the profile of the power progression is considerably shallower. For example the effective corridor length increases up to approximately 13 mm for addition powers above 3.0D.

By the term "corridor", we mean an area of the intermediate zone of varying power bounded by nasal and temporal contours of tolerable aberration for foveal vision.

By the term "highest reading point" we mean the highest point along the eye path where the wearer can read normal size text at the 40 cm reading distance without perceiving the blur. This is equal to the nominal prescribed add minus the effective depth of focus for near vision which is around 0.50 D for a broad range of addition powers.

The corridor has a "corridor length" (L), which corresponds to the length of the segment of the visual fixation locus which extends from the vertical height of the fitting cross (FC) to the vertical height of the near vision measurement point. For example, in a typical lens element according to the present invention, the power progression begins at the fitting cross (FC) height.

By the term "effective corridor length" as used herein we mean the length from the "fitting cross" (FC) to the highest reading point (HRP) on the lens surface.

By the term "lens element", we mean all forms of individual refractive optical bodies employed in the opthalmatic arts, including, but not limited to, lenses, lens waters and semi-finished lens blanks requiring further finishing to a particular patient's prescription. Also included are formers used in the manufacture of progressive glass lenses and moulds for the casting of progressive lenses in polymeric material such as the material sold under the trade designation CR39.

By the term "astigmatism or surface astigmatism", we mean a measure of the degree to which the curvature of the lens varies among intersecting planes which are normal to the surface of the lens at a point on the surface.

The distribution of surface astigmatism and/or surface power may be varied proximate the peripheries of the upper (distance) and/or lower (near) viewing zones.

In a preferred form, the lens element may exhibit a modified distribution of peripheral astigmatism. The distribution of peripheral astigmatism may for example exhibit a shift away from the distance-peripheral boundary.

Preferably the distribution of surface astigmatism and/or ray traced RMS power error exhibits a relatively low gradient proximate the distance periphery and a relatively high gradient proximate the near periphery.

This modification may, for example, both reduce sensitivity to horizontal fining errors and make the lens easier to adapt to, as the transition between the distance and intermediate peripheral zone is less perceptible. It may also permit a greater smoothing of the prism gradients over large areas of the peripheral zones lessening the uncomfortable swimming sensation that can be induced by a progressive lens.

Such a modification may provide the lower (near) viewing zone with relatively high blur gradients. Whilst this might appear to be disadvantageous, it may occur at a position on the lens surface which is close to the lower periphery of the lens that is rarely used by the wearer. So, this is an acceptable trade-off in designing a more functional progressive lens.

This modification in peripheral blur distribution can be quantified by examining the ratio of the maximum rate of change of the ray traced RMS power error along vertical lines horizontally offset from the Fitting Cross (FC) a specified distance, for example equal to 15 mm on the lens surface, to the maximum horizontal rate of change of the RMS power error at the level of the near vision measurement point (NMP). In a preferred form, this ratio may be less than approximately 0.60 and may preferably vary from approximately 0.40 to 0.60.

In a preferred aspect of the present invention, the location of the corridor of the opthalmatic lens element may be dictated at least in part by the visual fixation locus;

the visual fixation locus being inset generally horizontally nasally below the fitting cross (FC) of the lens element.

The degree of inset may vary along the eyepath profile relative to up to three reference points therealong. The first one is the 0.5 D local addition power (LAP) point, which represents the depth of focus limited distance vision point. The degree of the horizontal 0.5 D LAP inset may decrease with increasing addition power.

By the term "Local Addition Power" as used herein we mean the surface power offset at a specific point along the eye path line with reference to the power at the distance measurement point.

The second reference point along the eye path is the "highest reading point" (HRP). The second reference point may exhibit a generally constant inset corresponding to the reading distance of approximately 40 cm.

The third reference point is the "near measurement point" (NMP). The third reference point may exhibit a constant 2 mm inset for addition powers up to 2.50 D and then may increase gradually with increases in addition power, e.g. up to 2.8 mm for the 3.50 D addition power. The increased horizontal inset at high addition powers is due to the shortened reading distance for the high add wearers, thus allowing such wearers to benefit from an increased magnification of the image.

By the term "visual fixation locus", as used herein, we mean the set of points which are the intersection of the lens surface and the patient's line of sight as he or she fixates on objects in the median plane. The term does not signify a required, continuous eye movement path. Rather, the visual fixation locus indicates the set of points corresponding to variously positioned objects in the median plane. As will be explained in detail below, the visual fixation locus takes into account the fact that the wearer may or may not use the accommodative reserve for a particular fixation. As a result, points at different locations in the visual fixation locus are provided having a power sufficient for comfortable use at the appropriate object distances.

The progressive opthalmatic lens element, in a preferred form, may exhibit a multi-segmented power progression profile.

Accordingly, in a preferred aspect of the present invention, there is provided a progressive opthalmatic lens element including a lens surface having
an upper viewing zone having a surface power corresponding to distance vision,
a lower viewing zone having a greater surface power than the upper viewing zone to achieve a refracting power corresponding to near vision; and
an intermediate zone extending across the lens element having a surface power varying from that of the upper viewing zone to that of the lower viewing zone and including
a corridor of relatively low surface astigmatism; the corridor exhibiting a power progression from that of the upper viewing zone to that of the threshold of the lower viewing zone;
the corridor and lower viewing zone exhibiting a multi-segmented power progression profile.

By the term "multi-segmented power progression profile", we mean that the profile exhibits three or more distinct segments.

Applicants have found that by fixing the position of the highest reading point to that corresponding to the wearer's natural eye rotation for reading, the opthalmatic lens element provides improved comfort to the wearer and thus achieves greater acceptance by the wearer.

The power progression may include a first segment from the fitting cross (FC) to the 0.5 D LAP point.

The fitting cross (FC) is generally located at $(0, y_{FC})$ with the local addition power (LAP) of 0.0+0.125 D, −0.125 D. The value of $y_{FC}$ may vary, for example, from approximately 2 mm to 6 mm above the geometric centre of the lens element.

0.50 D LAP point of the eye path may exhibit an inset which is a function of the addition power ranging for example from 2.0 mm for 1.00 D addition (and lower) to 0.5 mm for 2.5 D additions and higher.

The power progression may include a second segment from the 0.5 D LAP to the highest reading point (HRP), located at $(2, y_{FC}-11)$ for adds up to 2.50 D, sliding down to $(2, y_{FC}-13)$ for the 3.00 D add and staying constant for the higher addition values.

The power progression profile may include a third segment from the HRP to the near measurement point (NMP), located at approximately $(x, y_{FC}-16)$. The slope of the power progression within the third segment varies from steeper than in the second segment for low addition powers through generally equal to that within the second segment at mid addition powers to relatively shallower at higher addition powers.

The power progression may include a fourth segment from the NMP to the Maximum Addition Power (MAP) point, at approximately $(x, y_{FC}-18.5)$. The MAP point has an addition power approximately 0.125 D above the nominal addition power of the lower (near) viewing zone, for lenses having adds up to a 2.50 D.

By the term "Maximum Add Power" (MAP) as used herein we mean the nominal addition power plus 0.125 D.

The MAP should be located at $y \sim y_{FC}-18.5$, with a nominal x coordinate of 2 mm for addition powers less than or equal to 2.50 D, and at an inset determined by the reciprocal of the addition power for addition powers higher than 2.50 D. A preferred implementation is to adjust the x coordinate to be equal to the point at which the chief ray from the near object point intersects the lens surface.

The eyepath below the MAP may generally be vertical.

In a still further preferred form, the value of the Reading Contour for low to medium addition powers, $P_r$ may in turn vary with addition power.

By the term "Reading Contour" as used herein, we mean the contour of the mean local addition power equal to the nominal addition power less 0.50 (minimum value 0.50 D) for adds up to 2.00 D. The co symmetric about the vertical meridian passing through the HRP. For higher additions the value of the Reading Contour varies such that the difference between the power at the NMP and the HRP gradually increases from 0.5 D for a 2.25 D addition power up to 1.00 D for the 3.50 D addition power.

In a preferred form the relationship between the Reading Contour, defined as the mean addition power at the highest reading point (HRP) and the nominal addition power, A, may be given by the following formula:

$$P_r = A - \alpha(2.5 - A)$$

$$\text{where } \alpha = \exp\left[-\frac{(A-2.5)^2}{1.575}\right]$$

| Add Power | Alpha | Reading Power |
|---|---|---|
| 0.75 | 0.143 | 0.500 |
| 1.00 | 0.240 | 0.641 |
| 1.25 | 0.371 | 0.786 |
| 1.50 | 0.530 | 0.970 |
| 1.75 | 0.700 | 1.225 |
| 2.00 | 0.853 | 1.573 |

The relationships between the Reading Contour Value and addition power and Alpha and addition power are illustrated in FIGS. 1 and 2 below.

The relationship applies up to addition powers of approximately 2.00 D, above which the variation of $P_r$ is as described earlier in this section.

In a preferred form, the progressive opthalmatic lens element, exhibiting a multi-segmented power progression profile, may again form part of a lens element series as described above.

Accordingly, in a preferred aspect, there is provided a series of progressive opthalmatic lens elements, each lens element including a lens surface having
an upper viewing zone having a surface power to achieve a refracting power corresponding to distance vision;
a lower viewing zone having a greater surface power than the upper viewing zone to achieve a refracting power corresponding to near vision; and
an intermediate zone extending across the lens element having a surface power varying from that of the upper viewing zone to that of the lower viewing zone and including a corridor of relatively low surface astigmatism;
the progressive opthalmatic lens series including
a first set of lens elements having at least one base curve suitable for use in providing a range of distance prescriptions for myopes, emmetropes or hyperopes, each lens element within a set differing in prescribed addition power and including a progressive design,
the corridor and lower viewing zone exhibiting a multi-segmented power progression profile;

wherein the power progression of each lens element within a set includes a first segment from the fitting cross (FC) to the 0.5 D Local Addition Power (LAP) point;

the fitting cross (FC) being located at (0, $y_{FC}$) wherein the value of $y_{FC}$ varies from approximately 2 mm to 6 mm above the geometric centre of the lens element; and the 0.5 D LAP point exhibiting an inset which is a function of the addition power ranging from approximately 2.0 mm for addition powers of 1.00 D and below, to approximately 0.5 mm for addition powers of approximately 2.50 D and above;

a second segment from the 0.50 D LAP point to the HRP;

the position of the HRP being located at (2, $y_{FC}$−11) for addition powers up to 2.50 D and ranging to (2, $y_{FC}$−13) for addition powers of approximately 3.00 D and above;

a third segment from the HRP to near vision measurement point (NMP), located at approximately (x, $y_{FC}$−16);

wherein the x coordinate is approximately 2 mm for addition powers less than or equal to approximately 2.50 D, and is inset by an amount determined by the reciprocal of the addition power for addition powers greater than 2.50 D;

the slope of the power progression within the third segment varying from steeper than in the second segment for low addition power through generally equal to that within the second segment at medium addition powers, to relatively shallow at high addition powers.

Preferably, the power progression includes a fourth segment from the NMP to the maximum addition power (MAP) point, at approximately (x, $y_{FC}$−18.5);

wherein the x coordinate is approximately 2 mm for addition powers less than or equal to approximately 2.50 D, and is inset by an amount determined by the reciprocal of the addition power for addition powers greater than 2.50 D.

More preferably, the value of the Reading Contour $P_r$, varies with addition power as described above.

The optical lens element according to the present invention may further include a relatively wide upper viewing zone with relatively low surface astigmatism. At high addition powers the upper viewing zone may exhibit slightly increased surface astigmatism.

In a preferred aspect of the present invention, the optical lens element may be designed to at least partially compensate for optical aberrations, generated, for example, by pantoscopic tilt in the as worn position and/or offset or wrap to suit the styling of the frame.

Accordingly, in a further preferred aspect of the present invention, there is provided a progressive opthalmatic lens element including a first lens surface having an upper viewing zone having a surface power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the corridor and lower viewing zone exhibiting a power progression profile having at least two segments, the slopes of which are related at least in part to the prescribed addition power and/or depth of focus of the wearer; and a lens base surface bearing a surface correction(s) to at least partially adjust for an observed optical aberration(s) within the upper viewing zone due to obliquity of incoming rays crossing the lens surface.

The progressive opthalmatic lens element according to this aspect may again form part of a lens element series as described above.

The optical aberration may be generated by astigmatism and by power errors. One measure combining these two kinds of errors is the RMS power error. Therefore, an optimisation merit function based on the RMS power error can effectively minimise both kinds of errors leading to wider viewing zones and an increased acceptance of the lens element by the wearer.

The optical aberration may be introduced by pantoscopic tilt and/or wrap of the lens element in an "as worn" configuration.

In a particular preferred embodiment of the present invention, the optical lens element may include a surface having a generally aspheric component that is asymmetric in the vertical (Y) and/or horizontal (X) direction.

It will be recognised that the asymmetry in the vertical direction may compensate for off-axis aberrations including aberrations introduced by pantoscopic tilt, in the upper (distance) viewing zone.

Where a lens element surface exhibits asymmetry in both the X and Y directions, off axis aberrations may be improved over substantially the entire surface of the lens element.

The asymmetry in the horizontal direction may compensate for aberrations introduced by cosmetic or safety wrap of the lens element in the "as worn" configuration.

Accordingly, in a further aspect of the present invention, there is provided a progressive opthalmatic lens element including a lens base surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the corridor and lower viewing zone exhibiting a power progression profile exhibiting at least two segments, the slopes of which are related at least in part to the accommodation reserve and/or the depth of focus of the wearer; and a lens base surface bearing a surface correction to at least partially adjust for an observed optical aberration(s) within the upper viewing zone due to obliquity of the incoming rays;

the lens surface correction being described by a polynomial asymmetric along the vertical (Y) and/or horizontal (X) meridian; and whose coefficients are chosen to minimise a merit function constructed of the sum of a selected optical aberration(s) within the upper and/or lower viewing zone.

The optical aberration(s) may include a power error.

The lens surface so formed thus bears an optical correction required to improve the optical performance within the upper and/or lower viewing zone.

Optical Aberrations

We may define a number of measures of the lens optical aberrations, such $$\text{mean power error (mpe)} = \frac{\varepsilon_{11} + \varepsilon_{22}}{2}$$

$$\text{astigmatic (cyl) error} = ((\varepsilon_{11} - \varepsilon_{22})^2 + 4\varepsilon_{12}^2)^{1/2}$$

$$\text{RMS power error} = \left(\frac{\varepsilon_{11}^2 + 2\varepsilon_{12}^2 + \varepsilon_{22}^2}{2}\right)^{1/2}$$

$$= \left((\text{mpe})^2 + \frac{1}{4}(\text{cyl error})^2\right)^{1/2}$$

where $\epsilon$ is the focal error matrix and may be written $$\varepsilon = \begin{pmatrix} \varepsilon_{11} & \varepsilon_{12} \\ \varepsilon_{21} & \varepsilon_{22} \end{pmatrix}$$

where $\epsilon_{12} = \epsilon_{21}$ by the choice of the orthomormal basis set.

Merit functions which may be applied depending on the specific application of the optimised lens include $$M_1 = \sum_\theta (\text{RMS blur})_\theta^2$$

$$M_2 = \sum_\theta ((\text{mpe})^2 + (\text{cyl error})^2)_\theta$$

$$M_3 = \sum_\theta \left(\frac{1}{16}(\text{mpe})^2 + (\text{cyl error})^2\right)_\theta$$

$$M_4 = \sum_\theta \left((\text{mpe})^2 + \frac{1}{16}(\text{cyl error})^2\right)_\theta$$

where summations are over a number of sample eye rotations $\theta$.

In a still further embodiment, a term may be included in the merit function that represents the cosmetics of the lens. For example, instead of using M alone, a modified merit function may be defined by $$M^* = M + \eta_\theta \left(\lambda^2 \left(\frac{V}{\pi r^2}\right)\right)^2$$

where $\eta^{74}$ denotes the number of sample eye rotations $\theta$ considered in M, r is a specified lens radius, and V is the lens volume out to the radius r. The factor $\lambda$ is seen to be a weighting on the average lens thickness.

Mathematical Description of Lens Surface

In a still further aspect of the present invention, there is provided a method of designing a progressive opthalmatic lens element including a first lens surface having an upper viewing zone having a surface power corresponding to distance vision, a lower viewing zone having a greater surface power than the upper viewing zone to achieve a retracting power corresponding to near vision; and an intermediate zone extending across the lens element having a surface power varying from that of the upper viewing zone to that of the lower viewing zone and including a corridor of relatively low surface astigmatism; the corridor exhibiting a power progression from that of the upper viewing zone to that of the threshold of the lower viewing zone, the corridor and lower viewing zone exhibiting a power progression profile having at least two segments, the slopes of which are related at least in part to the prescribed addition power and/or the depth of focus of the wearer;

the lens base surface bearing a surface correction(s) to at least partially adjust for an observed optical aberration (s) within the upper viewing zone;

which method includes selecting a base surface function for the lens surface in the form of an n'th order asymmetric polynomial:

$$z = \sum_{k=0,1,2,\ldots}^{n} \sum_{j=0,1,2,\ldots}^{k} C_{k-j,j} x^{k-j} y^j;$$

In its general form, the polynomial has all the even and odd powers of both x and y up to the powers of n and k respectively. In the designs without wrap or offset, the base curve has no odd powers of x and the odd powers of y may be limited to 1 and 3. All other terms of odd power in the above example may be set to zero.

The method according to the present invention may further include selecting a merit function relating to at least one optical aberration characteristic of the lens to be minimised;

computing the coefficients of the asymmetric polynomial surface function that minimise the said merit function within the upper viewing zone of the opthalmatic lens element;

replacing the coefficients for a spherical base curve in the original design with the computed coefficients to obtain a new optically optimised design; and fabricating an opthalmatic lens element having a lens surface shaped according to said modified surface function.

The optimisation function may be selected from one of the optimisation functions referred to above.

In a further aspect of the present invention, the method may further include selecting a modified merit function relating at least one optical aberration characteristic and at least one lens cosmetic characteristic to a merit figure.

The purpose of the modified merit function may be, for example to reduce the lens thickness, for example towards the periphery of the lens. The modified merit function may be of the type described above.

The opthalmatic lens element may be formulated from any suitable material. A polymeric material may be used. The polymeric material may be of any suitable type. The polymeric material may include a thermoplastic or thermoset material. A material of the diallyl glycol carbonate type, for example CR-39 (PPG Industries) may be used.

The polymeric article may be formed from cross-linkable polymeric casting compositions, for example as described in Applicants' U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material.

The opthalmatic lens element according to the present invention may further include standard additional coatings to the front or back surface, including electrochromic coatings.

The front lens surface may include an anti-reflective (AR) coating, for example of the type described in U.S. Pat. No. 5,704,692 to Applicants, the entire disclosure of which is incorporated herein by reference.

The front lens surface may include an abrasion resistant coating. e.g. of the type described in U.S. Pat. No. 4,954,591 to Applicants, the entire disclosure of which is incorporated herein by reference.

The front and back surfaces may further include one or more additions conventionally used in casting compositions such as inhibitors, dyes including thernochromic and photochromic dyes, e.g. as described above, polarising agents, UV stabilisers and materials capable of modifying refractive index.

The present invention will now be more fully described with reference to the accompanying figures and examples. It should be understood, however, that the description following is illustrative only and should not be taken in any way as a restriction on the generality of the invention described above.

The scale of the following FIGS. 15 16, 18 and 19 is indicated by the circles appearing therein, the diameter of which is 60 mm.

Figure 1:
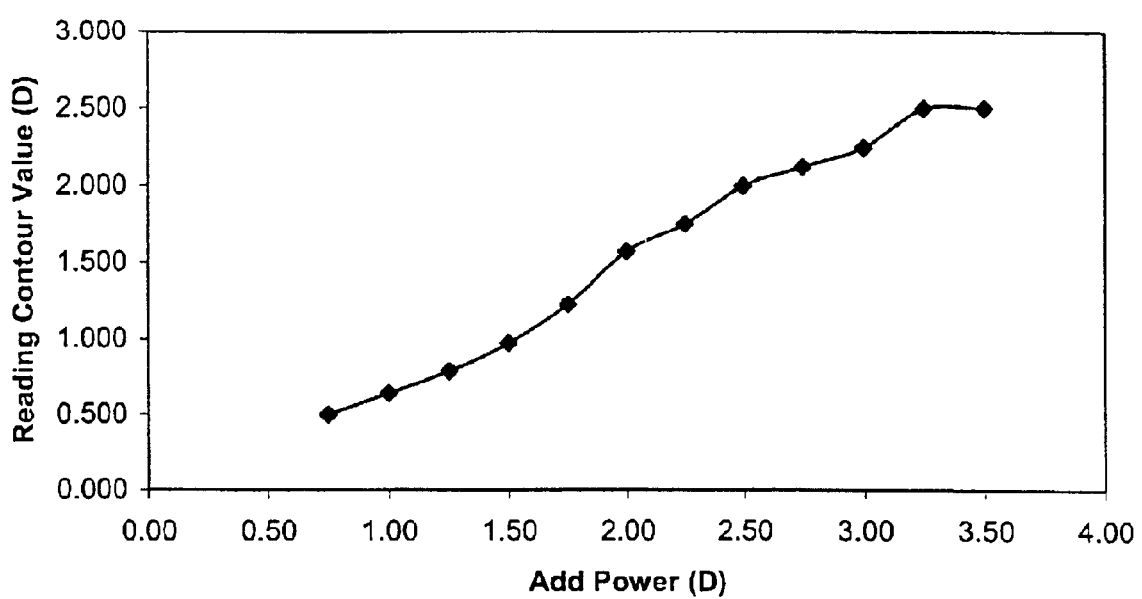
FIG. 1 is a graph illustrating the relationship between the reading contour value and addition power.
Figure 2:
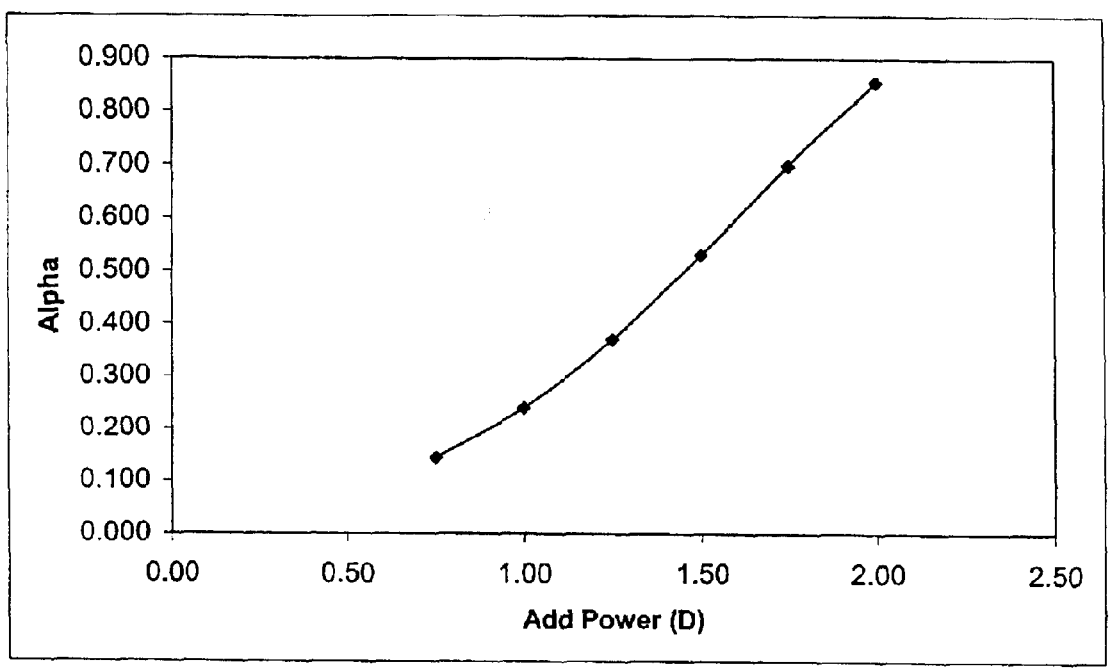
FIG. 2 is a graph illustrating the relationship between the coefficient alpha (α) and addition power for the low to medium addition powers.
Figure 3A:
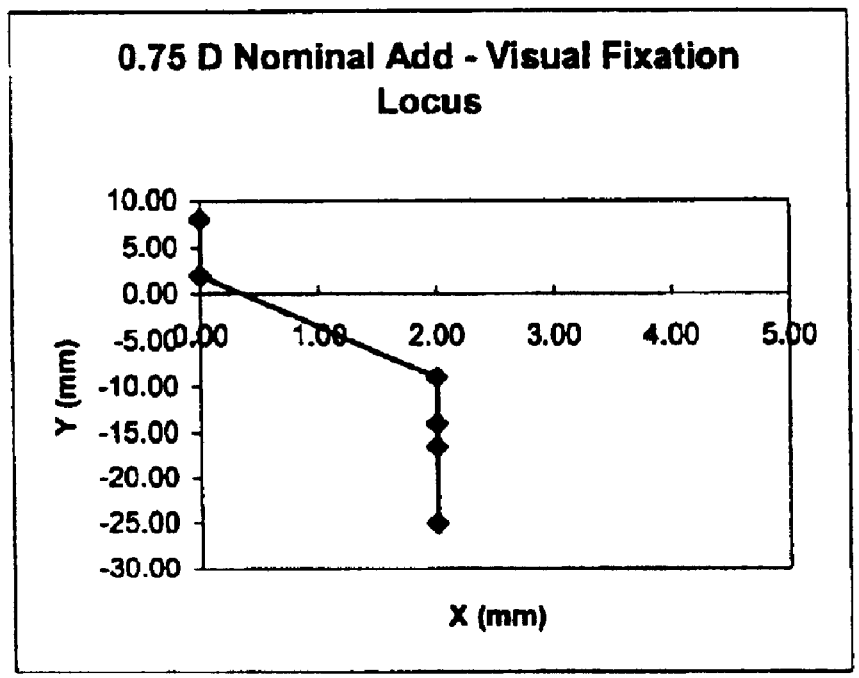
FIGS. 3a and 3b illustrate the location of the visual fixation locus and the corresponding power progression profile for an opthalmatic lens element according to the present invention having 0.75 dioptre (D) nominal addition power.
Figure 3B:
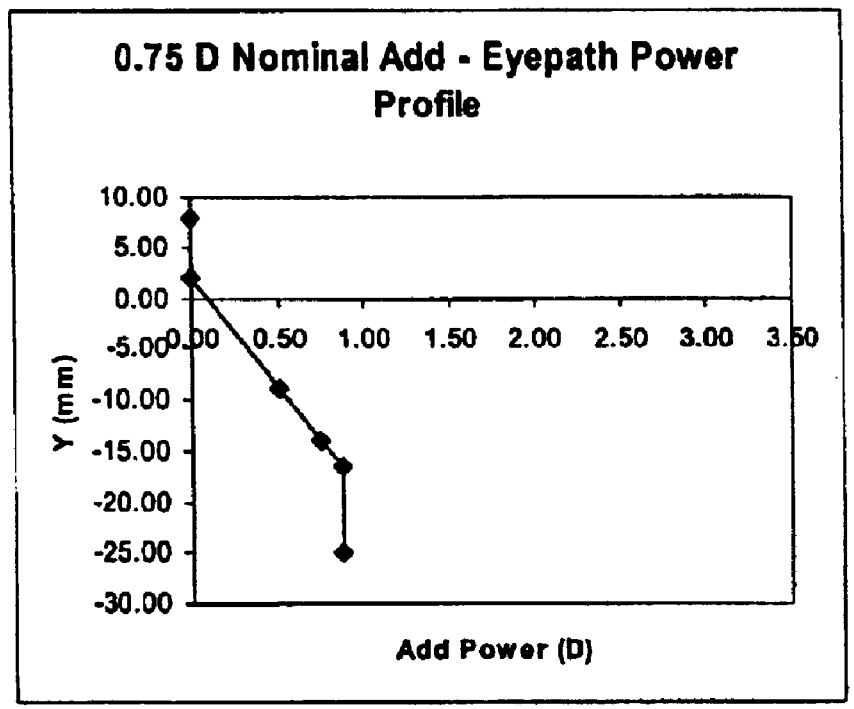
Figure 4A:
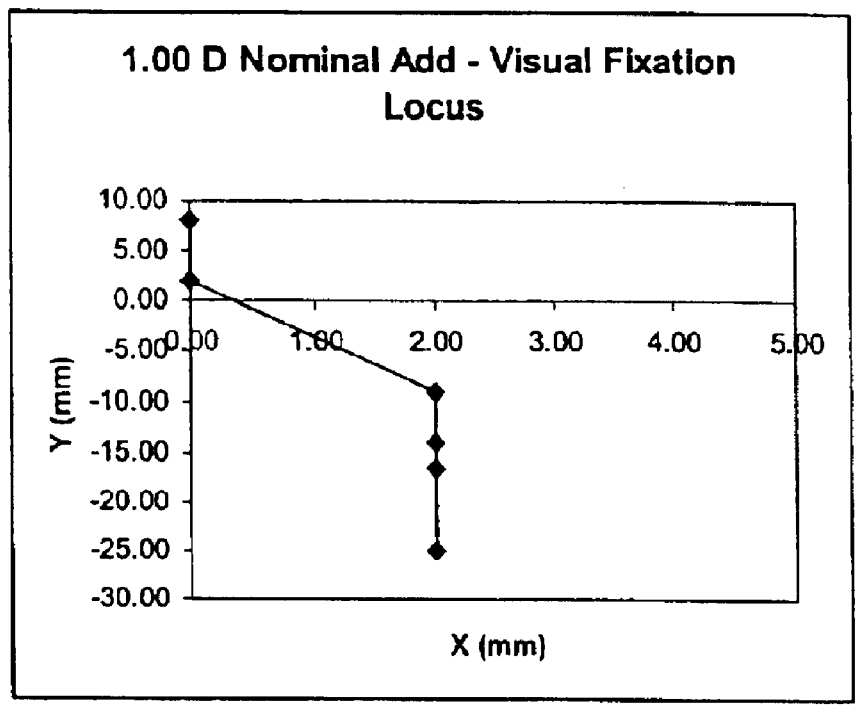
FIGS. 4a and 4b illustrate the location of the visual fixation locus and the corresponding power progression profile for an opthalmatic lens element according to the present invention having 1.00 dioptre (D) nominal addition power.
Figure 4B:
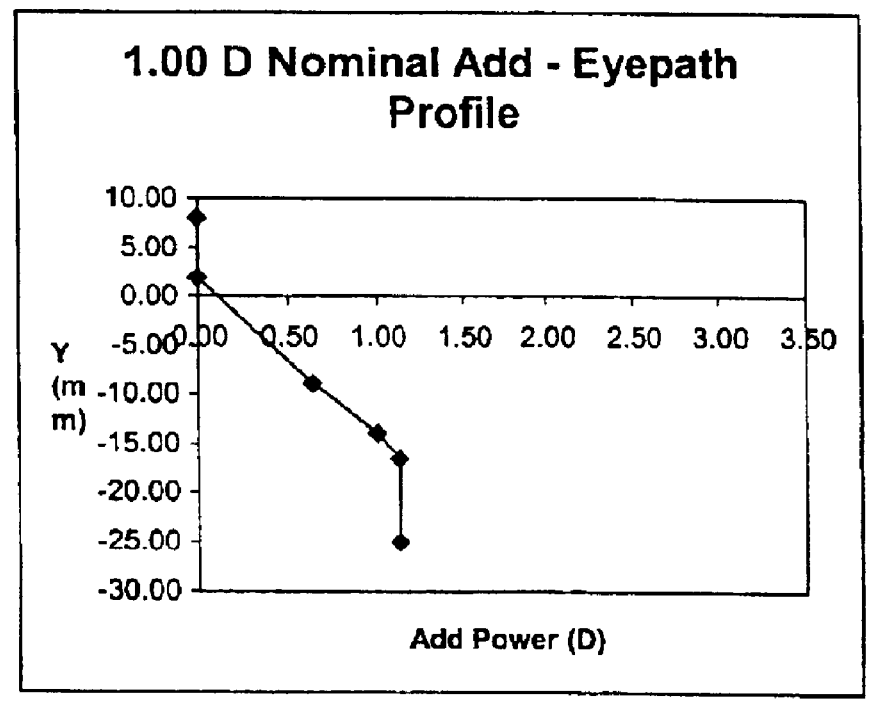
Figure 5A:
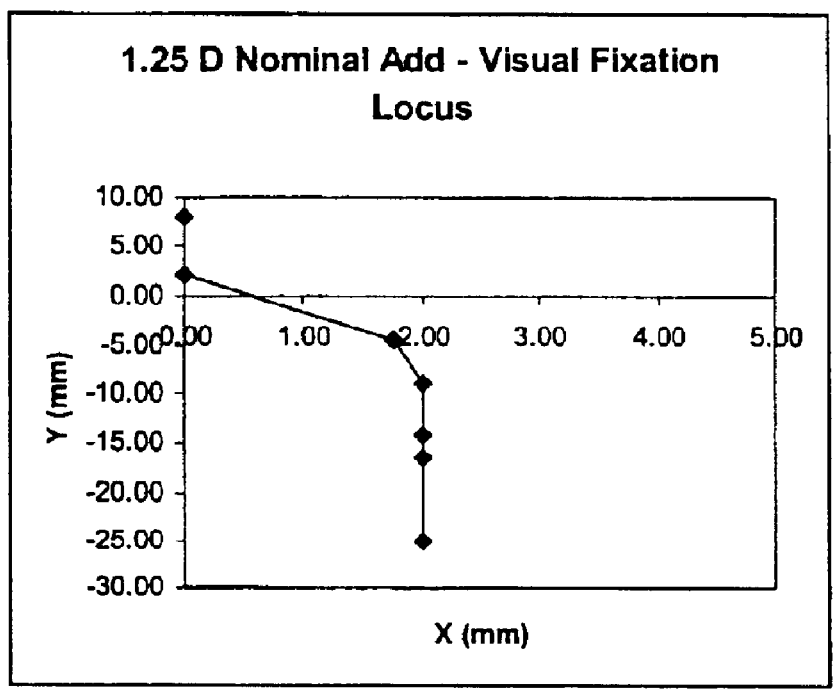
FIGS. 5a and 5b illustrate the location of the visual fixation locus and the corresponding power progression profile for an opthalmatic lens element according the present invention having 1.25 dioptre (D) nominal addition power.
Figure 5B:
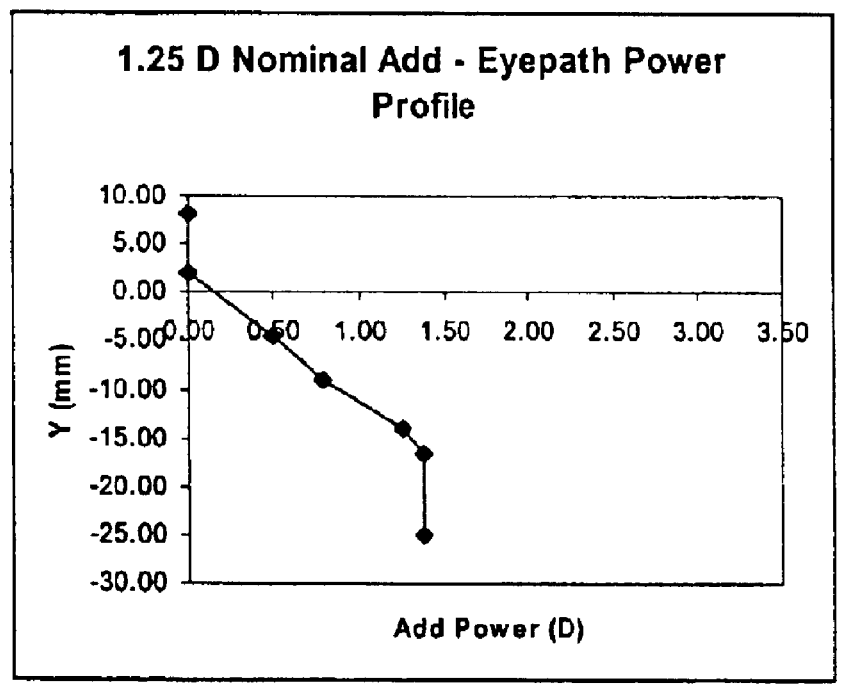
Figure 6A:
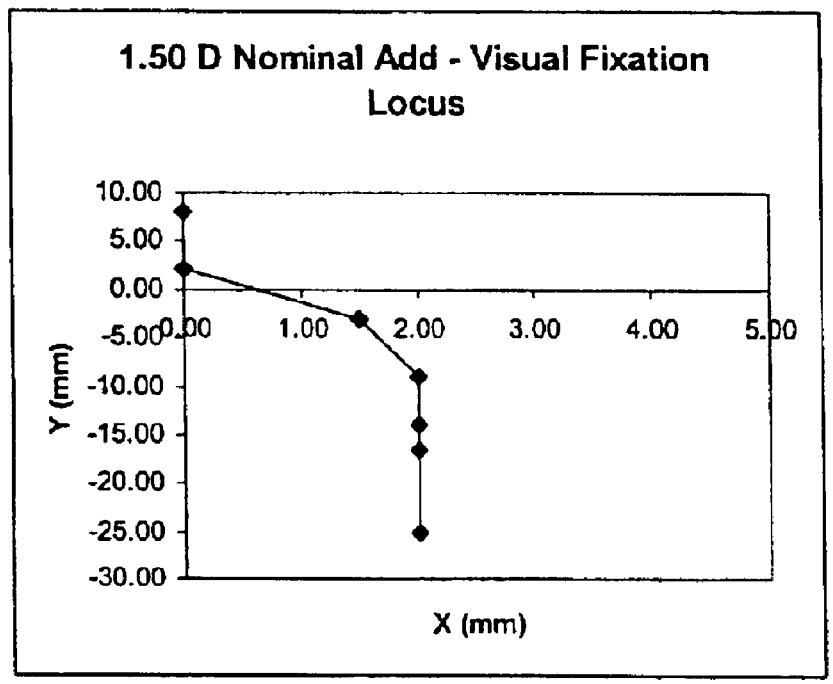
FIGS. 6a and 6b illustrate the location of the visual fixation locus and the corresponding power progression profile for an opthalmatic lens element according to the present invention having 1.50 dioptre (D) nominal addition power.
Figure 6B:
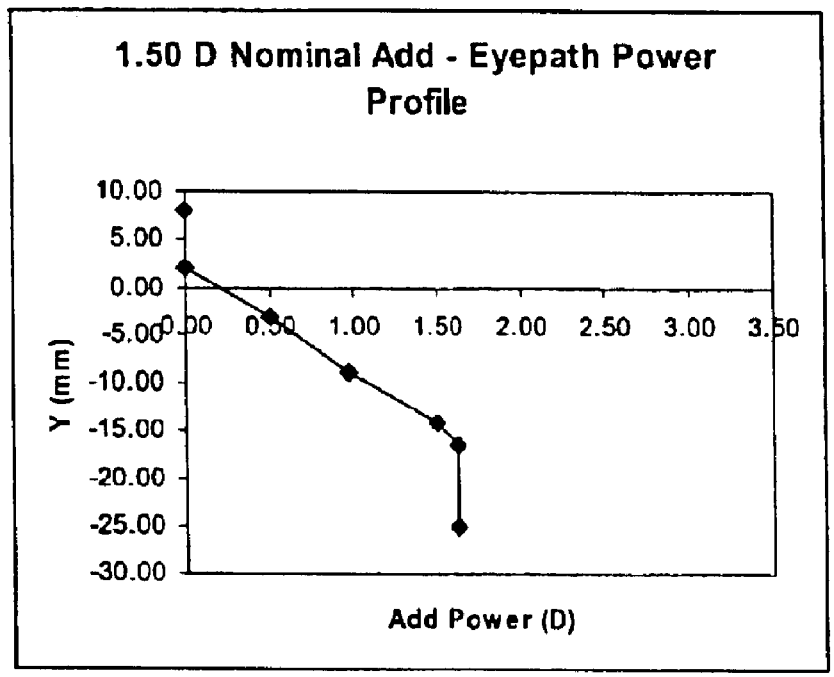
Figure 7A:
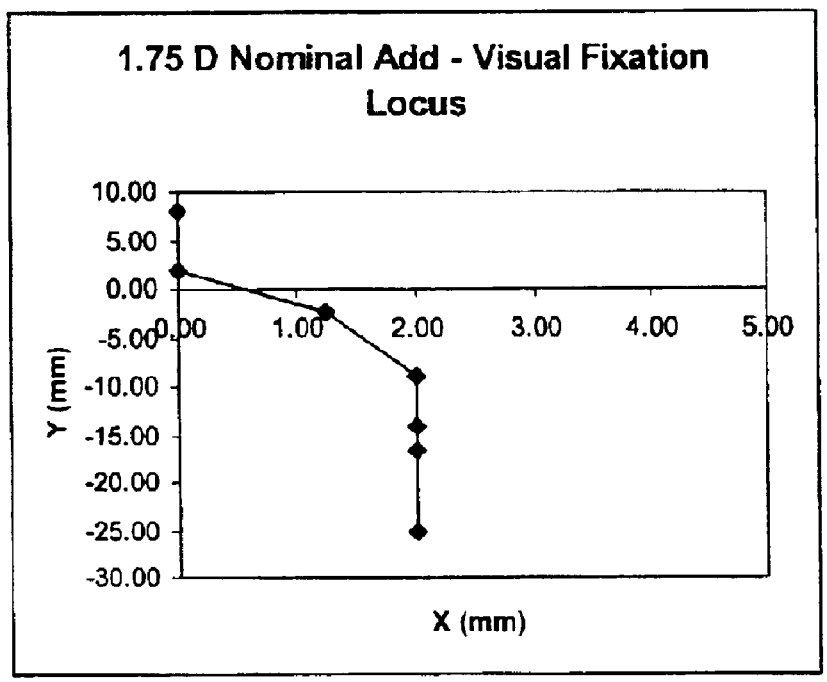
FIGS. 7a and 7b illustrate the location of the visual fixation locus and the corresponding power progression profile for an opthalmatic lens element according to the present invention having 1.75 dioptre (D) nominal addition power.
Figure 7B:
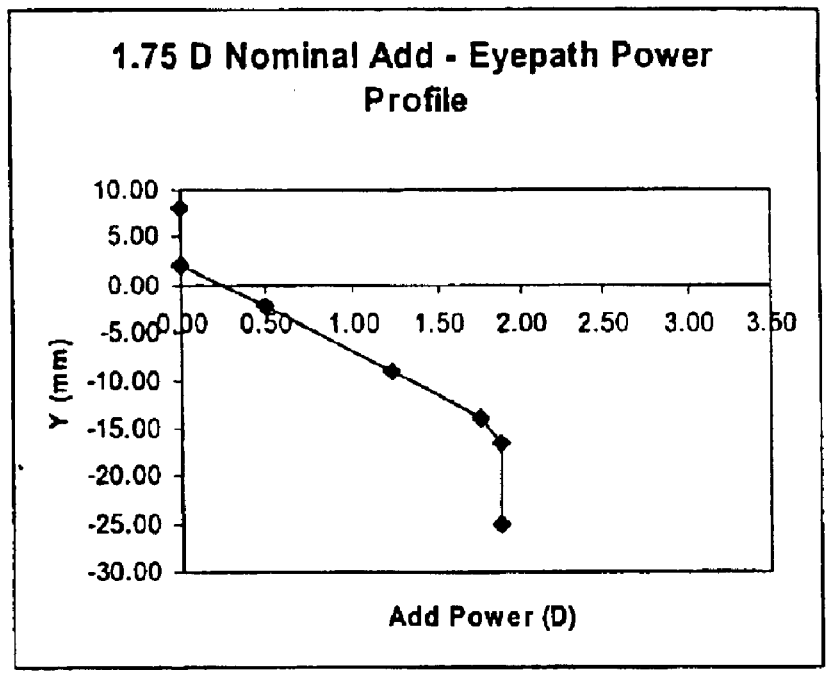
Figure 8A:
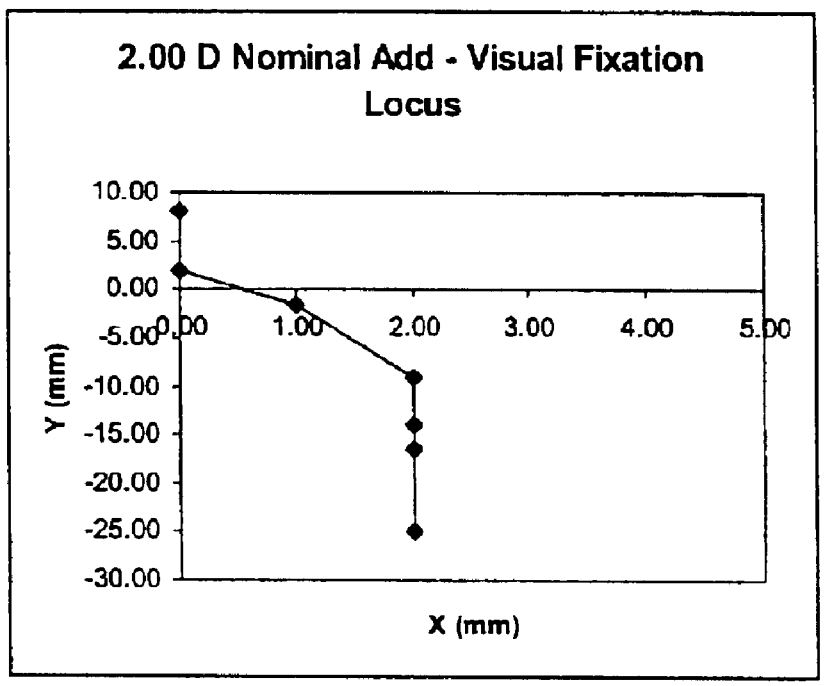
FIGS. 8a and 8b illustrate the location of the visual fixation locus and the corresponding power progression profile for an opthalmatic lens element according to the present invention having 2.00 dioptre (D) nominal addition power.
Figure 8B:
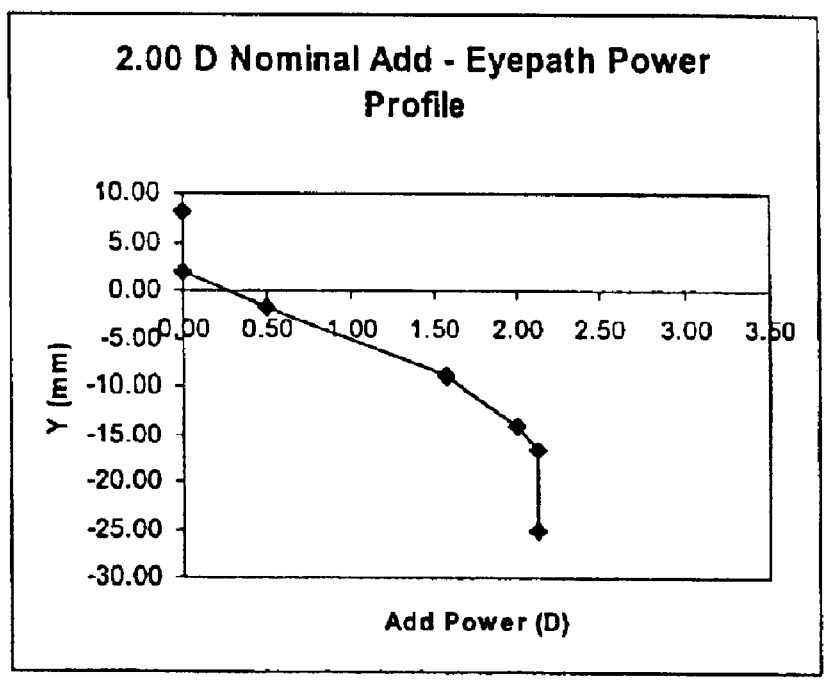
Figure 9A:
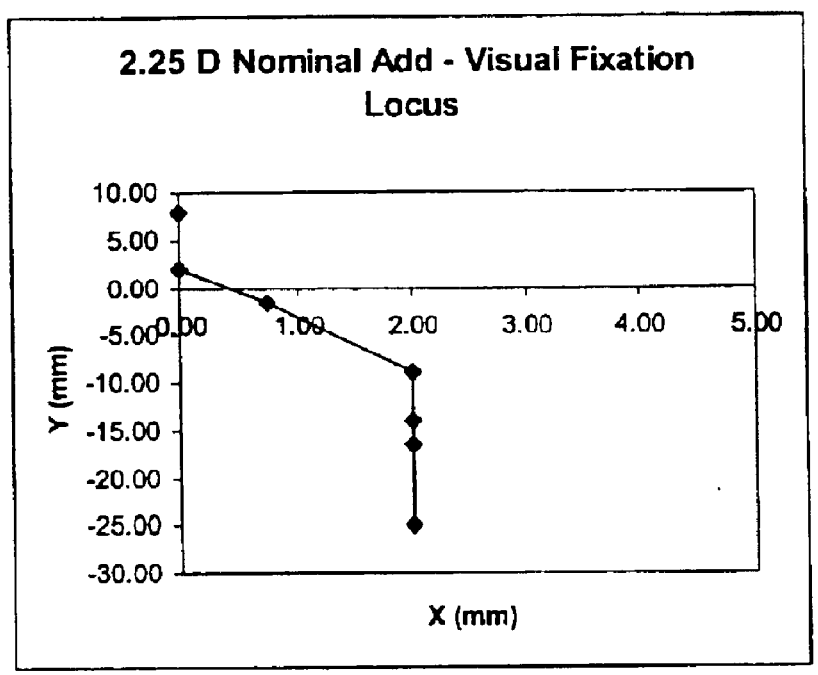
FIGS. 9a and 9b illustrate the location of the visual fixation locus and the corresponding power progression profile for an opthalmatic lens element according to the present invention having 2.25 dioptre (D) nominal addition power.
Figure 9B:
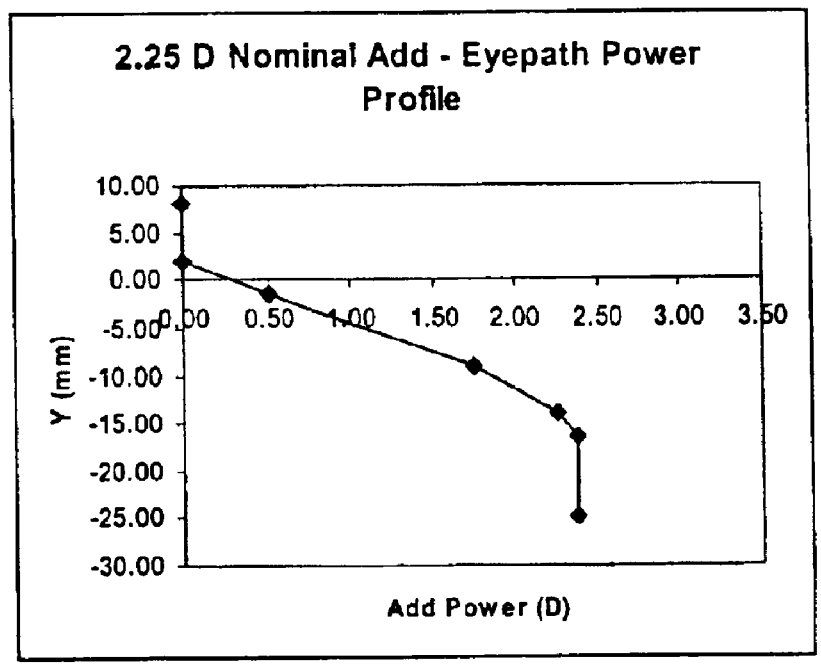
Figure 10A:
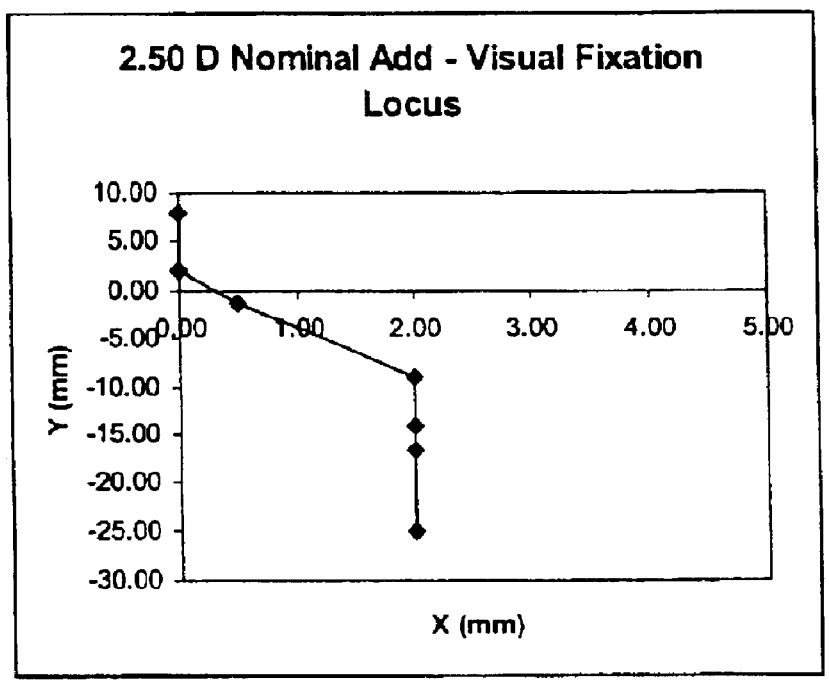
FIGS. 10a and 10b illustrate the location of the visual fixation locus and the corresponding power progression profile for an opthalmatic lens element according to the present invention having 2.50 dioptre (D) nominal addition power.
Figure 10B:
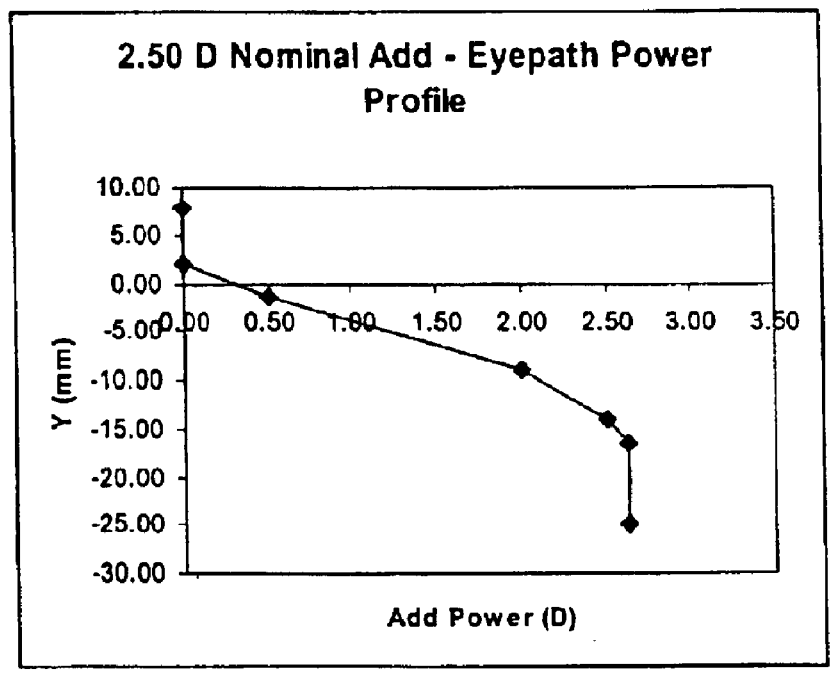
Figure 11A:
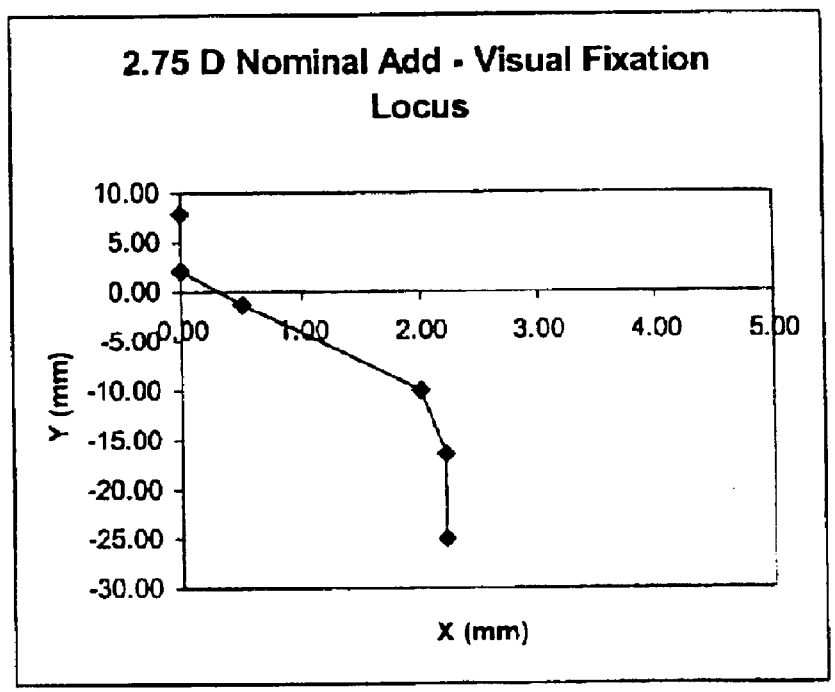
FIGS. 11a and 11b illustrate the location of the visual fixation locus and the corresponding power progression profile for an opthalmatic lens element according to the present invention having 2.75 dioptre (D) nominal addition power.
Figure 11B:
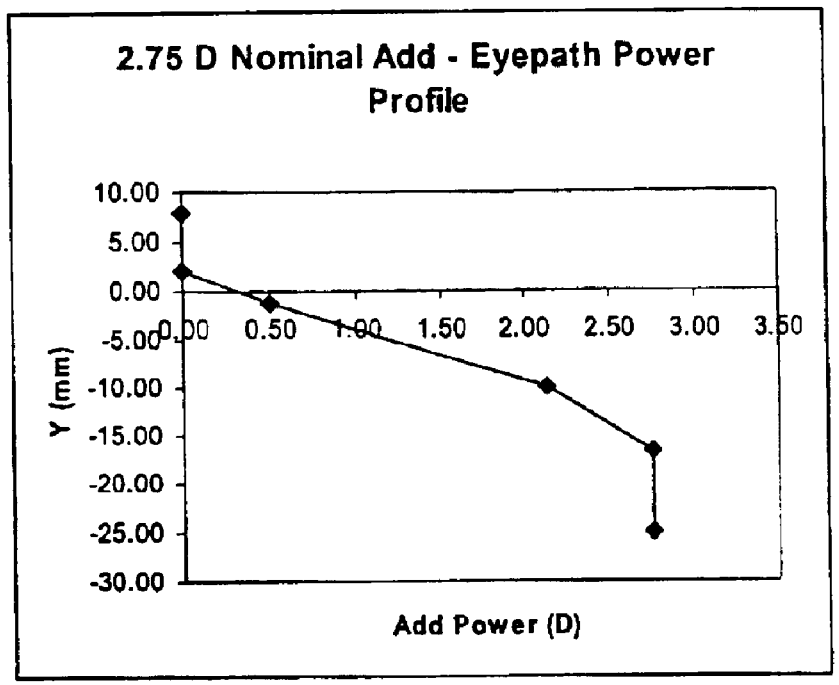
Figure 12A:
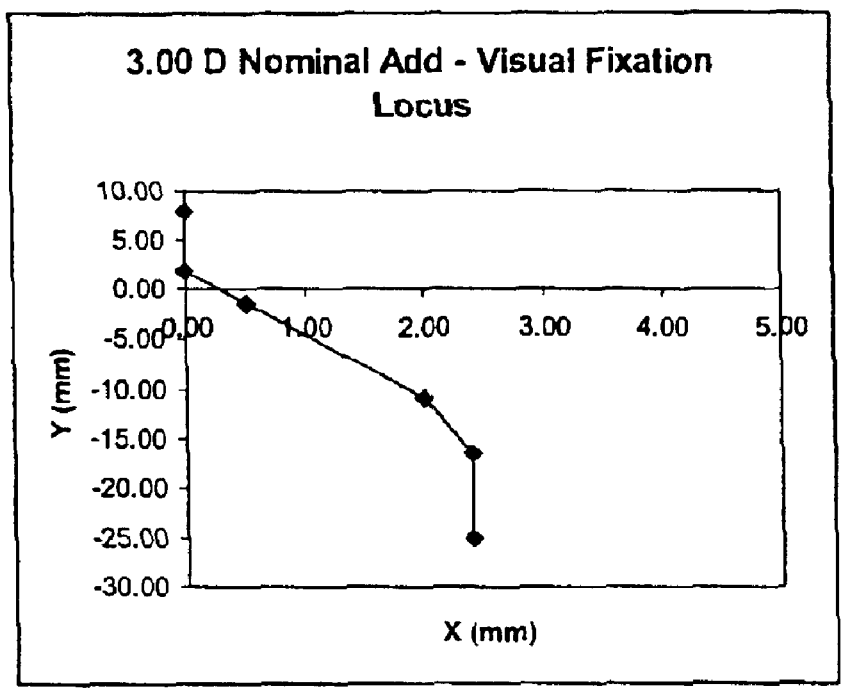
FIGS. 12a and 12b illustrate the location of the visual fixation locus and the corresponding power progression profile for an opthalmatic lens element according to the present invention having 3.00 dioptre (D) nominal addition power.
Figure 12B:
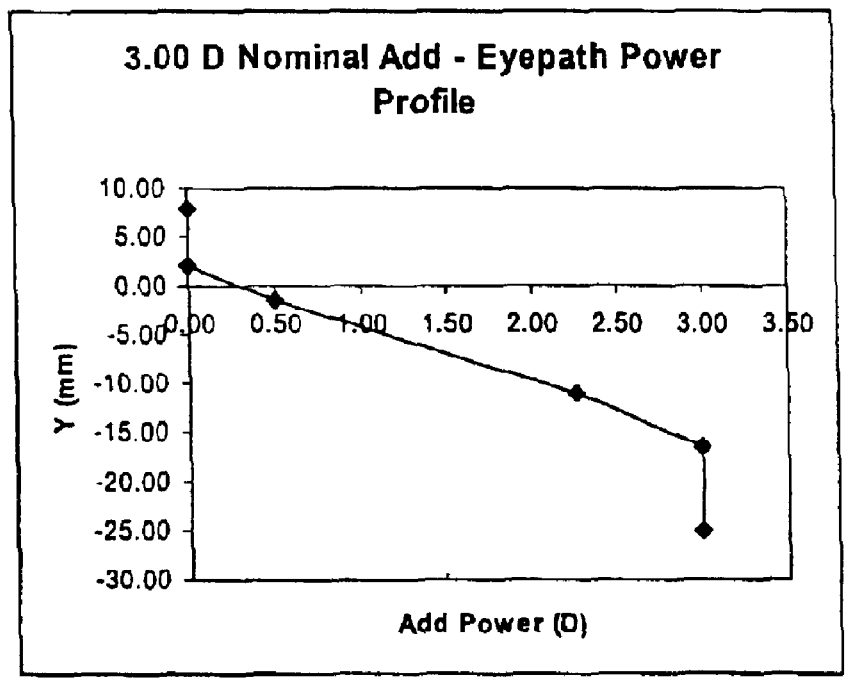
Figure 13A:
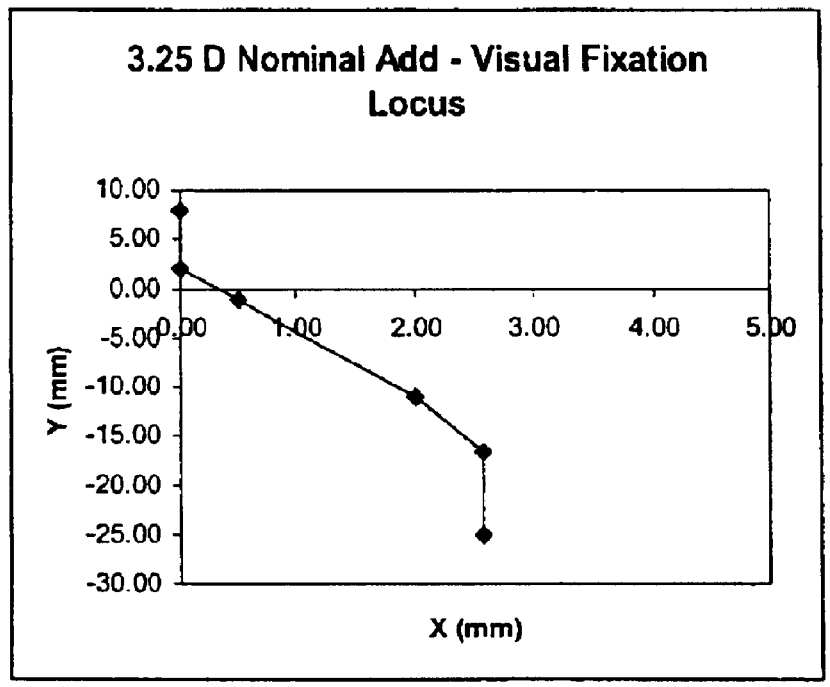
FIGS. 13a and 13b illustrate the location of the visual fixation locus and the corresponding power progression profile for an opthalmatic lens element according to the present invention having 3.25 dioptre (D) nominal addition power.
Figure 13B:
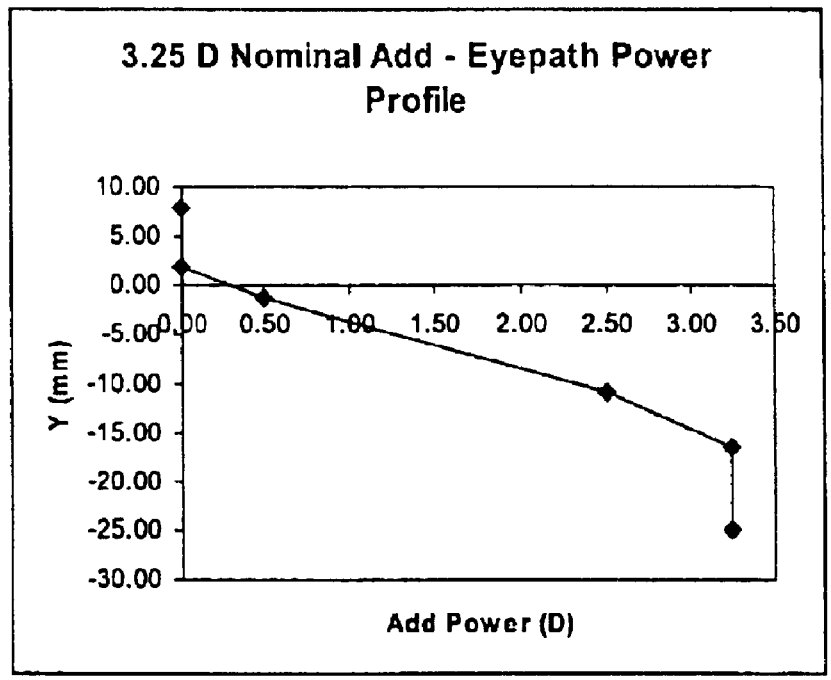
Figure 14A:
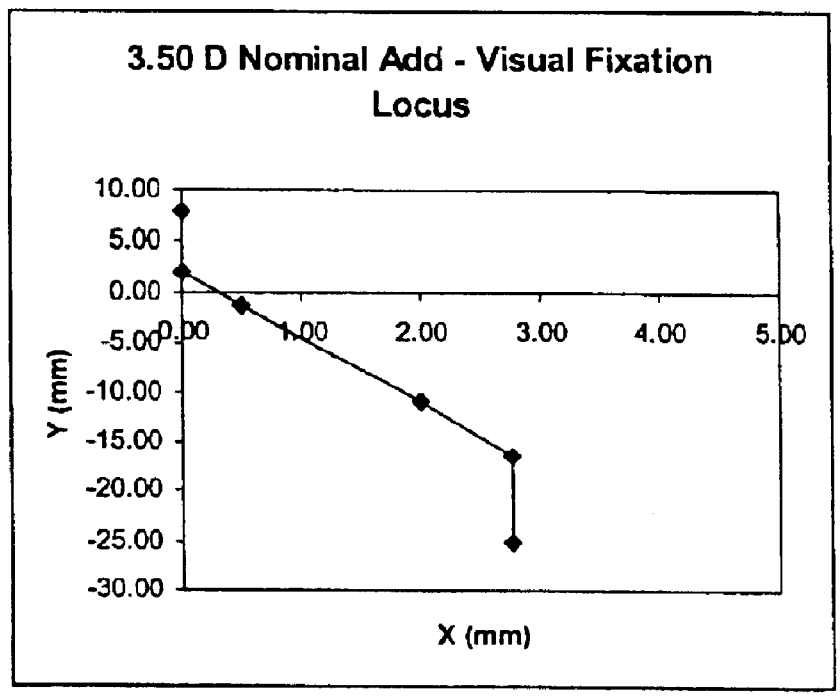
FIGS. 14a and 14b illustrate the location of the visual fixation locus and the corresponding power progression profile for an opthalmatic lens element according to the present invention having 3.50 dioptre (D) nominal addition power.
Figure 14B:
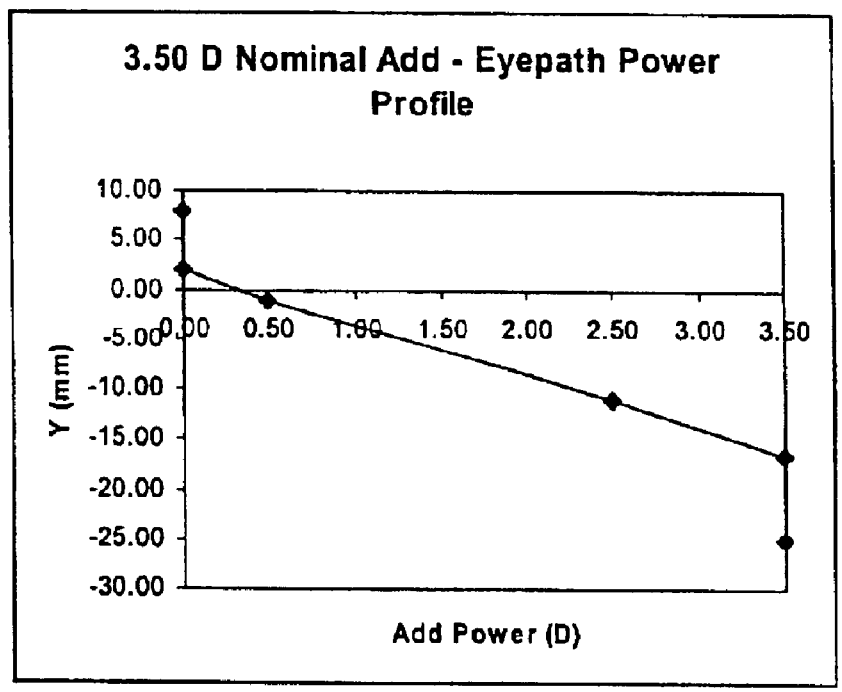
Figure 15A:
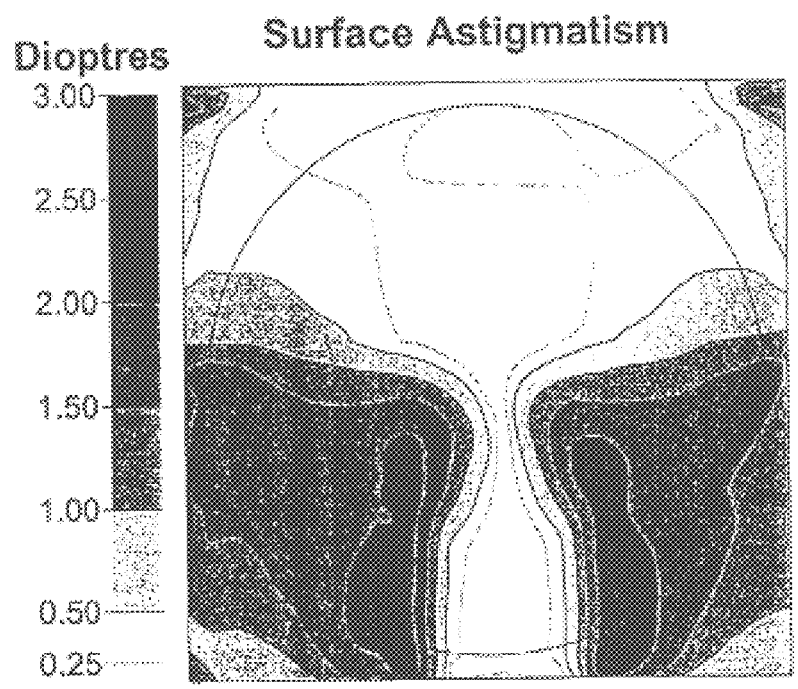

FIG. 15a illustrates a contour plot of surface astigmatism of an optical lens element according to the present invention, which has a 6.0 D base surface, where the surface is an asymmetric asphere.

Figure 15B:
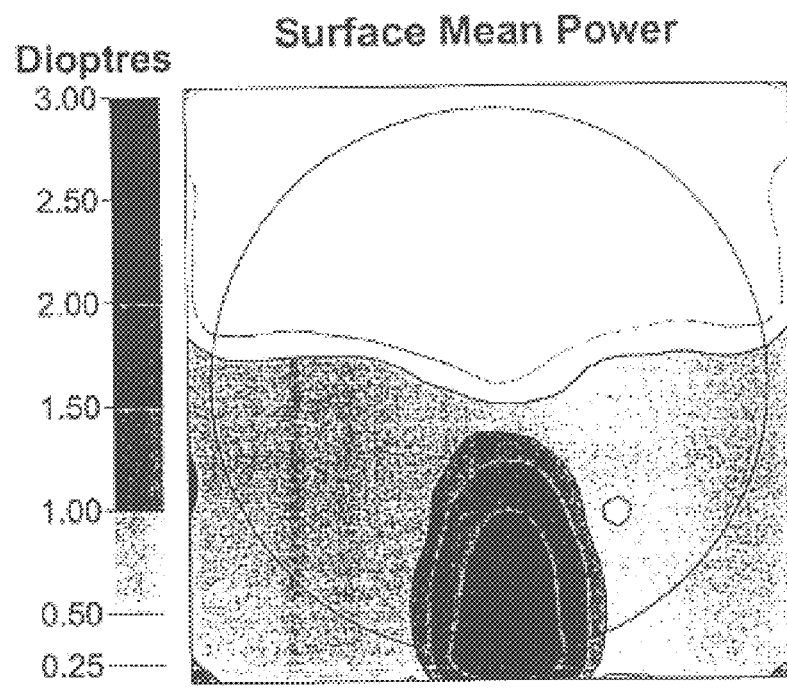

FIG. 15b illustrates a contour plot of surface mean power of the optical lens element according to FIG. 15a.

Ray tracing has been carried out with the model lens in the material with refractive index of 1.499 having the front surface as shown in FIGS. 15(a) and 15(b), a spherical back surface of 3.44 D, zero prism at the prism reference point and centre thickness of 2 mm; located in the front of the eye at a 27 mm back vertex distance from the centre of rotation of the eye and tilted pantoscopically by 7 degs. The assumed object field of the ray trace has a vertically varying distance starting at infinity (the dioptric distance of 0.00 D) for all rays crossing the front lens surface at elevations above the FC, through a linearly decreasing object distance below the FC up to the NMP, where the object distance was 0.4 m (2.5 D), and staying constant along each ray at 0.4 m for elevations below the NMP. In calculating the mean power error of the ray traced image as perceived by the wearer it has been assumed that the wearer has up to 0.5 D of reserve accommodation enabling him/her to cancel the negative mean power errors up to that magnitude in the lower part of the lens.

Figure 16A:
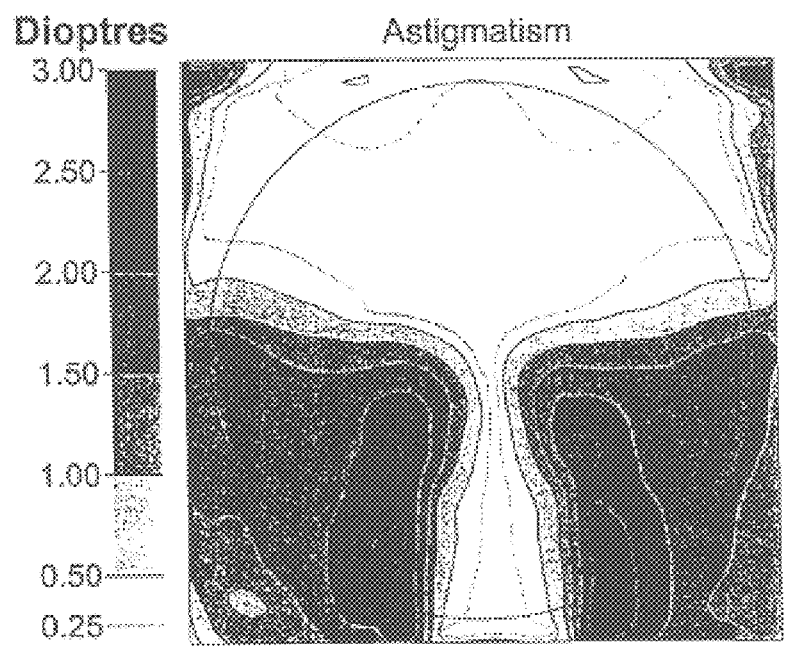

FIG. 16a illustrates a contour plot of ray traced optical astigmatism of an optical lens element having a spherical distance prescription of 2.5 D and a basic surface design as illustrated in FIG. 15.

Figure 16B:
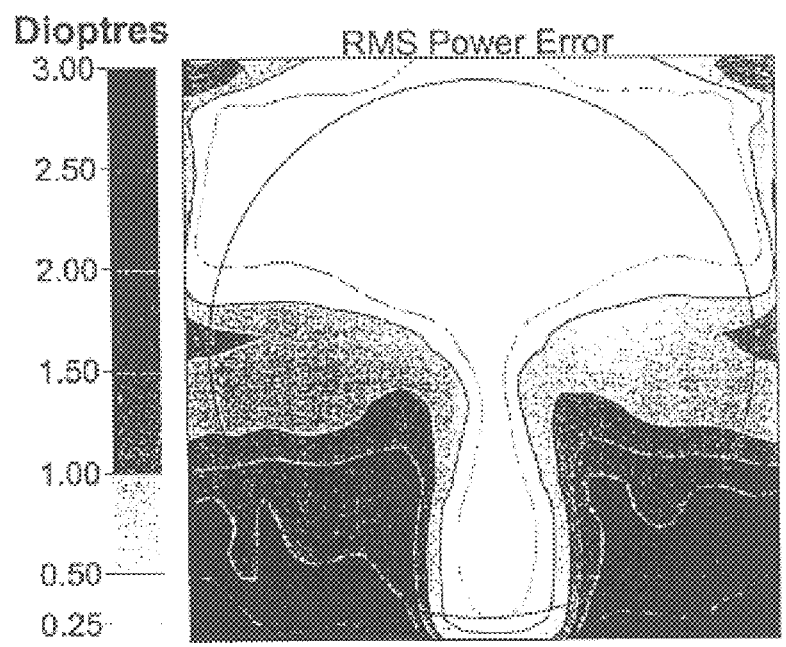

FIG. 16b illustrates a contour plot of ray traced RMS power error of an optical lens element having a spherical distance prescription of 2.5 D and a basic surface design as illustrated in FIG. 15. The distribution of RMS power error illustrated in FIG. 16b exhibits a relatively low gradient proximate the distance-periphery and a relatively high gradient proximate the near-periphery of the lens design.

Figure 17:
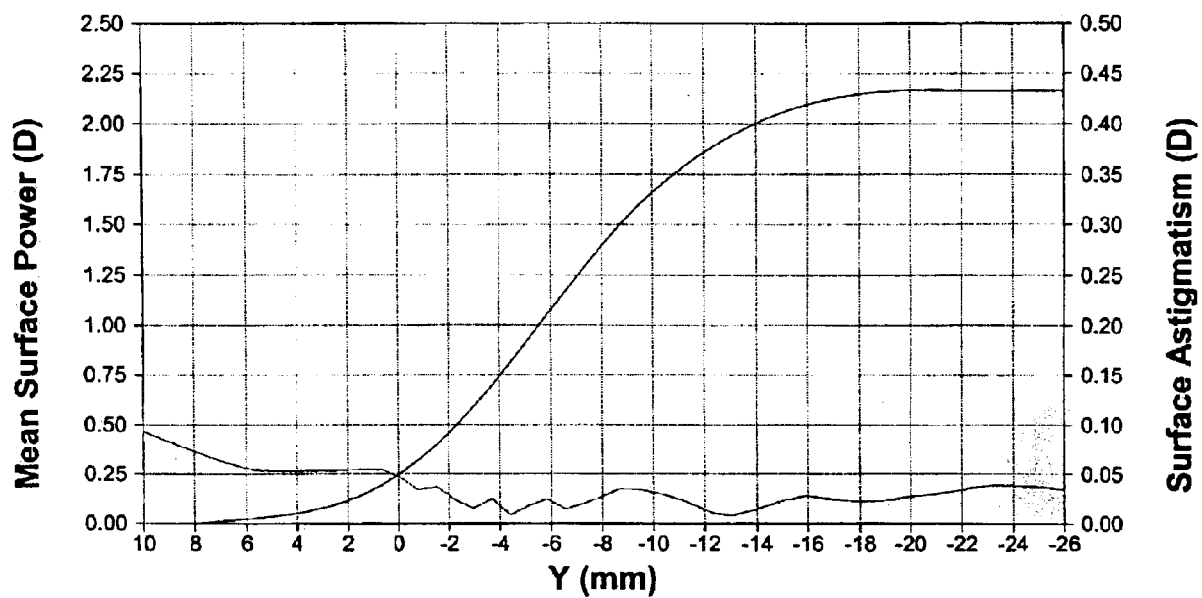

FIG. 17 illustrates a combined graph of the variation in mean surface power and surface astigmatism with vertical distance along the optical lens element mapped in FIG. 15.

Figure 18A:
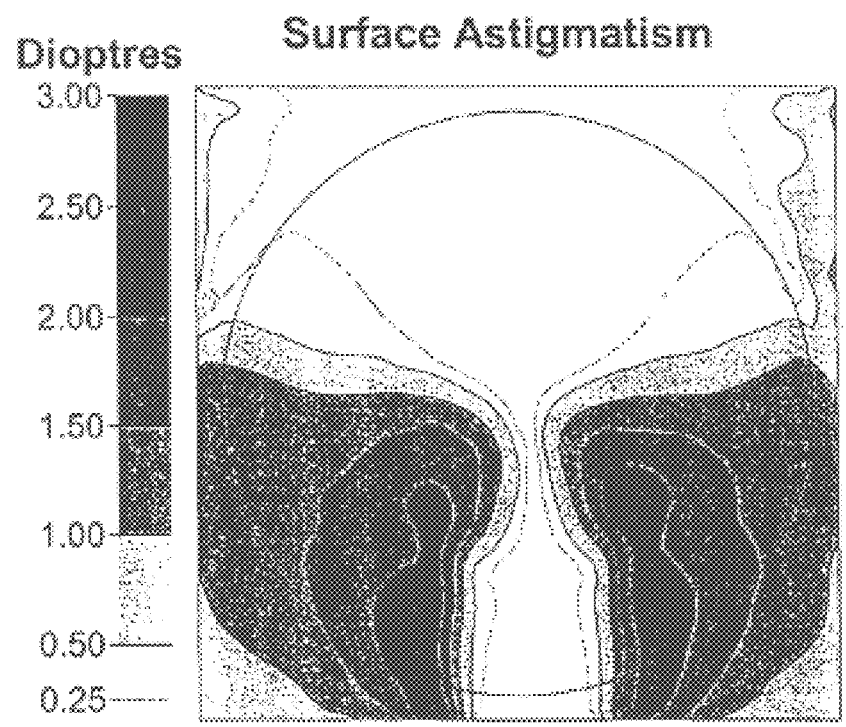

FIG. 18a illustrates a contour plot of surface astigmatism of an optical lens element according to the present invention, which has a 5.0 D spherical base curve.

Figure 18B:
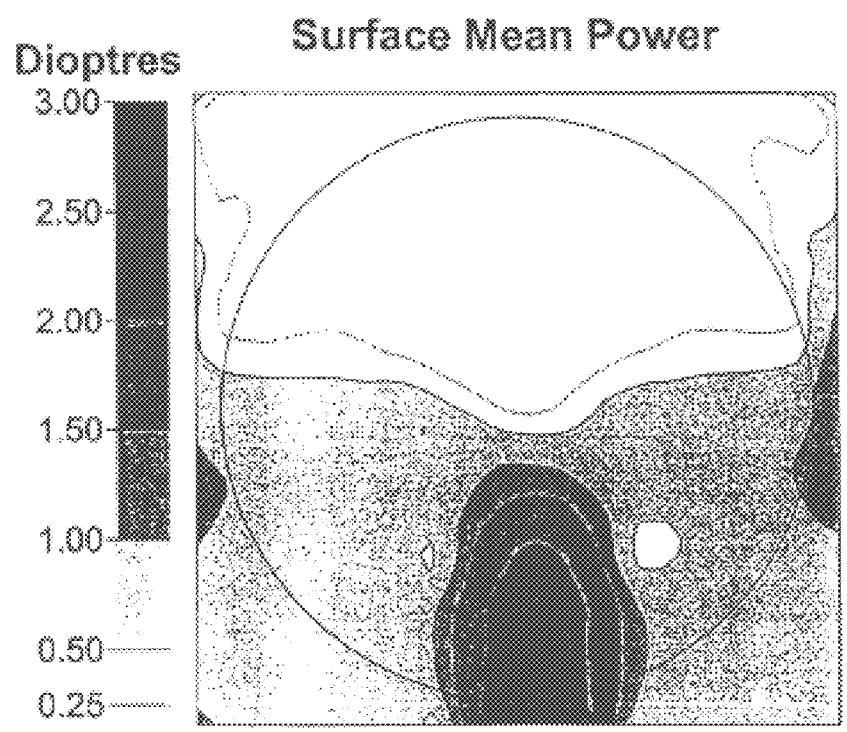

FIG. 18b illustrates a contour plot of surface mean power of the optical lens element according to FIG. 18a.

Figure 19A:
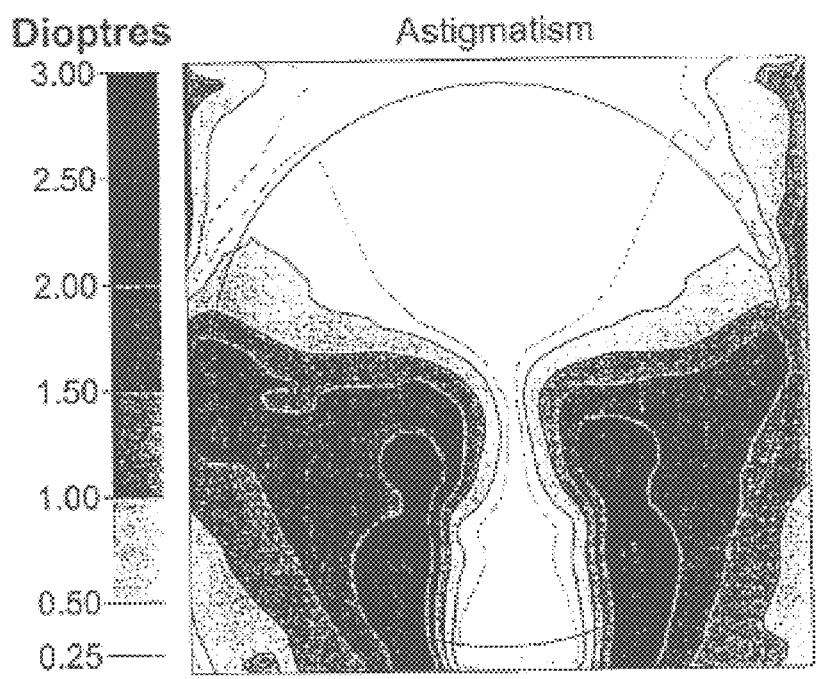

FIG. 19a illustrates a contour plot of ray traced optical astigmatism of an optical lens element having a spherical distance power prescription of 0.0 D and a basic surface design as illustrated in FIG. 18.

Figure 19B:
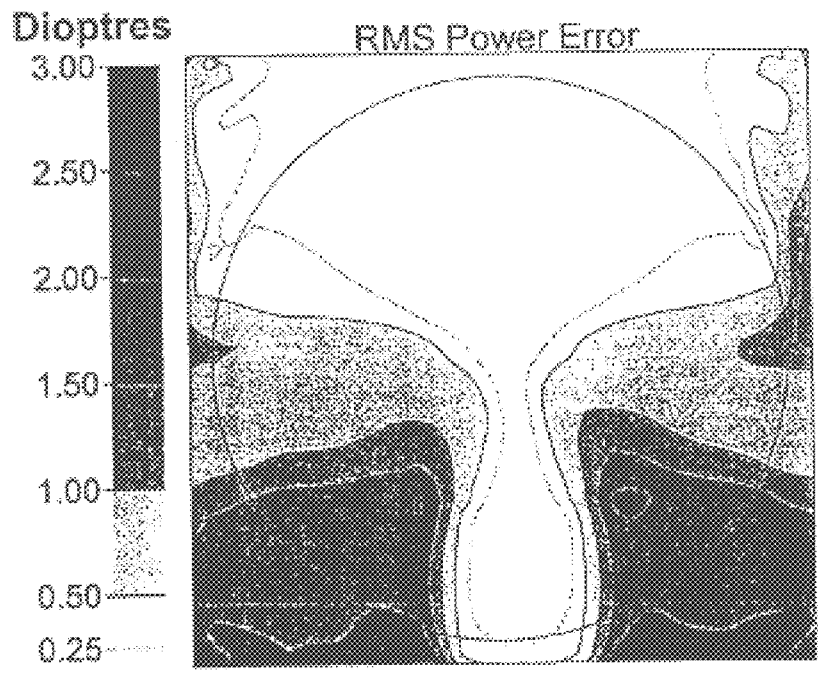

FIG. 19b illustrates a contour plot of ray traced RMS power error of an optical lens element having a spherical distance prescription of 0.0 D and a basic surface design as illustrated in FIG. 18. The distribution of RMS power error illustrated in FIG. 19b exhibits a relatively low gradient proximate the distance periphery and a relatively high gradient proximate the near periphery of the lens design.

Figure 20:
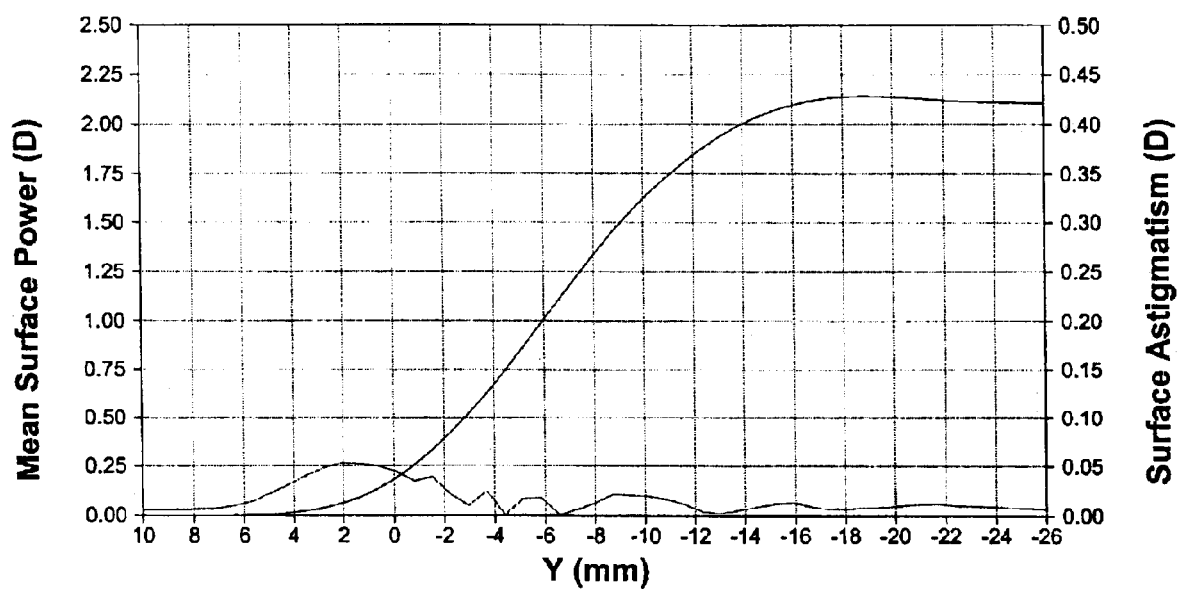

FIG. 20 illustrates a combined graph of the variation in mean surface power and surface astigmatism with vertical distance along the optical lens element mapped in FIG. 18.

It will be understood that the invention disclosed and defined in this specification extends to all alternative combinations of two or more of the individual features mentioned or evident from the text or drawings. All of these different combinations constitute various alternative aspects of the invention.

It will also be understood that the term "comprises" (or its grammatical variants) as used in this specification is equivalent to the term "includes" and should not be taken as excluding the presence of other elements or features.

What is claimed is:

1. A progressive opthalmatic lens element including a lens surface having
   an upper viewing zone having a surface power corresponding to distance vision,
   a lower viewing zone having a greater surface power than the upper viewing zone to achieve a refracting power corresponding to near vision; and
   an intermediate zone extending across the lens element having a surface power varying from that of the upper viewing zone to that of the lower viewing zone and including
      a corridor of relatively low surface astigmatism; the corridor exhibiting a power progression from that of the upper viewing zone to that of the threshold of the lower viewing zone,
      the corridor and lower viewing zone exhibiting a power progression profile having at least two segments with different slopes, the slopes of which being related at least in part to the prescribed addition power and the depth of focus of the wearer.

2. A progressive opthalmatic lens element according to claim 1, wherein the lens element has an addition power from approximately 0.75 D to 1.50 D and as exhibits a relatively shallow power progression within the upper part of the corridor; and
   a relatively steep power progression from the lower part of the corridor to the near vision measurement point (NMP).

3. A progressive opthalmatic lens element according to claim 2, wherein the power progression profile includes a first segment within the upper part of the corridor from the fitting cross (FC) to the highest reading point (HRP) and a second segment within the lower part of the corridor from the highest reading point to the near vision measurement point (NMP).

4. A progressive opthalmatic lens element according to claim 1, wherein the lens element has an addition power of from approximately 1.75 D to 3.00 D and exhibits a relatively steep power progression within the upper part of the corridor; and
   a relatively shallow power progression from the lower part of the corridor to the near vision measurement point.

5. A progressive opthalmatic lens element according to claim 4, wherein the power progression profile includes a first segment within the upper part of the corridor from the fitting cross (FC) to the highest reading point (HRP) and a second segment within the lower part of the corridor from the highest reading point to the near vision measurement point (NMP).

6. A progressive opthalmatic lens element according to claim 5, wherein the relatively steep power progression in the first segment is such that the effective corridor length is very short.

7. A progressive opthalmatic lens element according to claim 6, wherein the effective corridor length is approximately 11 mm, for addition powers up to approximately 2.50 D and increasing with increased addition power thereabove up to approximately 13 mm for addition powers above 3.0 D.

8. A progressive opthalmatic lens element according to claim 1, wherein the distribution of surface astigmatism and/or ray traced RMS power error exhibits a relatively low gradient proximate the distance periphery and a relatively high gradient proximate the near periphery.

9. A progressive opthalmatic lens element according to claim 8, wherein the ratio of the maximum rate of change of the ray traced RMS power error along the vertical lines offset 15 mm from the fitting cross (FC) to the maximum horizontal rate of change of the RMS power error at the level of the near vision measurement point (NMP) is less than approximately 0.60.

10. A progressive opthalmatic lens element according to claim 1, wherein the location of the corridor is dictated at least in part by the visual fixation locus; the visual fixation locus being inset generally horizontally nasally below the fitting cross of the lens element.

11. A progressive opthalmatic lens element according to claim 10, wherein the degree of inset varies along the eyepath profile relative to up to three reference points therealong.

12. A progressive opthalmatic lens element according to claim 11, wherein, at the 0.5 D local addition power point (LAP) the degree of horizontal inset decreases with increasing addition power.

13. A progressive opthalmatic lens element according to claim 12, wherein, at the highest reading point (HRP) the inset is generally constant and corresponds to that of a reading distance of approximately 40 cm.

14. A progressive opthalmatic lens element according to claim 13, wherein the horizontal inset at the NMP is a generally constant 2 mm up to addition powers of approximately 2.50 D, and then increases gradually with increasing addition power, up to a value of approximately 2.8 mm for a 3.50 D addition power.

15. The lens element of claim 1, wherein the lens element is a member of a series of lens elements, the lens elements having different addition powers and wherein the slopes of said at least two segments of each lens element in the series are determined at least in part based on the addition power of that lens element and the depth of focus of the wearer as indicated by the prescribed addition power.

16. A progressive opthalmatic lens element including a continuous lens surface having
   an upper viewing zone having a surface power corresponding to distance vision,
   a lower viewing zone having a greater surface power than the upper viewing zone to achieve a refracting power corresponding to near vision; and
   an intermediate zone extending across the lens element having a surface power varying from that of the upper viewing zone to that of the lower viewing zone and including
      a corridor of relatively low surface astigmatism; the corridor exhibiting a power progression from that of the upper viewing zone to that of the threshold of the lower viewing zone;

the corridor and lower viewing zone exhibiting a multi-segmented power progression profile having at least two segments of different slopes.

17. A progressive opthalmatic lens element according to claim 16, wherein the power progression includes a first segment from the fitting cross (FC) to the 0.5 D Local Addition Power (LAP) point;

the fitting cross (FC) being located at (0, $y_{FC}$) wherein the value of $y_{FC}$ varies from approximately 2 mm to 6 mm above the geometric centre of the lens element; and the 0.5 D LAP point exhibiting an inset which is a function of the addition power ranging from approximately 2.0 mm for addition powers of 1.00 D and below, to approximately 0.5 mm for addition powers of approximately 2.50 D and above.

18. A progressive opthalmatic lens element according to claim 17, including a second segment from the 0.50 D LAP point to the highest reading point (HRP);

the position of the HRP being located at (2, $y_{FC}-11$) for addition powers up to 2.50 D and ranging to (2, $y_{FC}-13$) for addition powers of approximately 3.00 D and above.

19. A progressive opthalmatic lens element according to claim 18, wherein the power progressive profile includes a third segment from the HRP to the near vision measurement point (NMP), located at approximately (x, $y_{FC}-16$);

wherein the x coordinate is approximately 2 mm for addition powers less than or equal to approximately 2.50 D, and is inset by an amount determined by the reciprocal of the addition power for addition powers greater than 2.50 D;

the slope of the power progression within the third segment varying from steeper than in the second segment for low addition powers through generally equal to that within the second segment at medium addition powers, to relatively shallow at high addition powers.

20. A progressive opthalmatic lens element according to claim 19, wherein the x coordinate is adjusted to be equal to the point at which the chief ray from the near object point intersects the lens surface.

21. A progressive opthalmatic lens element according to claim 19, wherein the power progression includes a fourth segment from the NMP to the maximum addition power (MAP) point, at approximately (x, $y_{FC}-18.5$);

wherein the x coordinate is approximately 2 mm for addition powers less than or equal to approximately 2.50 D, and is inset by an amount determined by the reciprocal of the addition power for addition powers greater than 2.50 D.

22. A progressive opthalmatic lens element according to claim 21, wherein the x coordinate is adjusted to be equal to the point at which the chief ray from the near object point intersects the lens surface.

23. A progressive opthalmatic lens element according to claim 16, wherein the value of the Reading Contour for low to medium addition powers, $P_r$, varies with addition power.

24. A progressive opthalmatic lens element according to claim 23, wherein the relationship between the value of the Reading Contour, defined as the mean addition power at the highest reading point (HRP) and the nominal addition power, A, is given by the formula $$P_r = A\alpha(2.5-A)$$

where $\alpha = \exp\left[-\frac{(A-2.5)^2}{1.575}\right]$ up to addition powers of 2.00 D.

25. A progressive opthalmatic lens element according to claim 24 wherein, for addition powers above 2.00 D, the value of the Reading Contour varies such that the difference between the power at the NMP and the HRP gradually increases from 0.5 D for a 2.25 D to 2.50 D addition powers up to 1.00 D for a 3.50 D addition power.

26. A progressive opthalmatic lens element including a first lens surface having an upper viewing zone having a surface power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the corridor and lower viewing zone exhibiting a power progression profile having at least two segments, with different slopes, the slopes of which being related at least in part to the prescribed addition power and depth of focus of the wearer; and a lens base surface bearing a surface correction(s) to at least partially adjust for an observed optical aberration (s) within the upper viewing zone due to obliquity of incoming rays crossing the lens surface.

27. The lens element of claim 26, wherein the lens element is a member of a series of lens elements, the lens elements having different addition powers and wherein the slopes of said at least two segments of each lens element are determined at least in part based on the addition power of that lens element and the depth of focus of the wearer as indicated by the prescribed addition power.

28. A progressive opthalmatic lens element according to claim 27, wherein the optical aberration is introduced by pantoscopic tilt and/or wrap of the lens element in an "as worn" configuration;

the lens base surface having a generally aspheric component that is asymmetric in the vertical (y) and/or horizontal (x) direction.

29. A series of progressive opthalmatic lens elements each including a lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the corridor and lower viewing zone exhibiting a power progression profile having at least two segments, the slopes of which are related at least in part to the prescribed addition power and the depth of focus of the wearer; and a lens base surface bearing a surface correction to at least partially adjust for an observed optical aberration(s)

within the upper viewing zone due to obliquity of the incoming rays;

the lens base surface correction being described by a polynomial asymmetric along the vertical (Y) and/or horizontal (X) meridian; and whose coefficients are chosen to minimise a merit function constructed of the sum of a selected optical aberration(s) within the upper and/or lower viewing zone.

30. A method of designing progressive opthalmatic lens elements including a first lens surface having an upper viewing zone having a surface power corresponding to distance vision, a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism; the corridor exhibiting a power progression from that of the upper viewing zone to that of the threshold of the lower viewing zone, the corridor and lower viewing zone exhibiting a power progression profile having at least two segments, the slopes of which are related at least in part to the prescribed addition power and the depth of focus of the wearer;

the lens base surface bearing a surface correction(s) to at least partially adjust for an observed optical aberration(s) within the upper viewing zone;

which method includes selecting a base surface function for the lens surface in the form of an n'th order asymmetric polynomial:

$$z = \sum_{k=0,1,2,\ldots}^{n} \sum_{j=0,1,2,\ldots}^{k} C_{k-j,j} x^{k-j} y^{j}.$$

31. A method according to claim 30, further including selecting a merit function relating to at least one optical aberration characteristic of the lens to be minimised;

computing the coefficients of the asymmetric polynomial surface function that minimise the said merit function within the upper viewing zone of the opthalmatic lens element;

replacing the coefficients for a spherical base curve in the original design with the computed coefficients to obtain a new optically optimised design; and fabricating an opthalmatic lens element having a lens surface shaped according to said modified merit function.

32. A method according to claim 31, further including selecting a modified merit function relating at least one optical aberration characteristic and at least one lens cosmetic characteristic to a merit figure.

33. A series of progressive opthalmatic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the progressive opthalmatic lens series including first, second and third sets of lens elements having at least one base curve suitable for use in providing a range of distance prescriptions for myopes, emmetropes or hyperopes, respectively, each lens element within a set differing in prescribed addition power and including a progressive design, the corridor and lower viewing zone exhibiting a power progression profile having at least two segments the slopes of which are related to the prescribed addition power and depth or focus of the wearer;

each lens element within a set having an addition power of from approximately 0.75 D to 1.50 D, exhibiting a relatively shallow power progression in the first segment and a relatively steep power progression in the second segment; and having an addition power of from approximately 1.75 D to 3.00 D, exhibiting a relatively steep power progression in the first segment and a relatively shallow power progression in the second segment.

34. A lens element series according to claim 33 wherein the location of the corridor in each lens element within a set is dictated at least in part by the visual fixation locus; the visual fixation locus being inset generally horizontally nasally below the fitting cross of the lens element; the degree of inset varying along the eyepath profile relative to up to three reference points therealong.

35. A lens element series according to claim 34, wherein at the 0.5 D local addition power point (LAP) the degree of horizontal inset decreases with increasing addition power;

at the highest reading point (HRP) the inset is generally constant and corresponds to that of a reading distance of approximately 40 cm;

at the near measurement point the horizontal inset is a generally constant 2 mm up to addition powers of approximately 2.50 D, and then increases gradually with increasing addition power, up to a value of approximately 2.8 mm for a 3.50 D addition power.

36. A series of progressive opthalmatic lens elements, each lens element including a lens surface having an upper viewing zone having a surface power to achieve a refracting power corresponding to distance vision;

a lower viewing zone having a greater surface power than the upper viewing zone to achieve a refracting power corresponding to near vision; and an intermediate zone extending across the lens element having a surface power varying from that of the upper viewing zone to that of the lower viewing zone and including a corridor of relatively low surface astigmatism;

the progressive opthalmatic lens series including a first, second and third set of lens elements having at least one base curve suitable for use in providing a range of distance prescriptions for myopes, emmetropes or hyperopes, respectively, each lens element within a set differing in prescribed addition power and including a progressive design, the corridor and lower viewing zone exhibiting a multi-segmented power progression profile;

wherein the power progression of each lens element within a set includes a first segment from the fitting cross (FC) to the 0.5 D Local Addition Power (LAP) point;

the fitting cross (FC) being located at (0, $y_{FC}$) wherein the value of $y_{FC}$ varies from approximately 2 mm to 6 mm above the geometric center of the lens element; and the 0.5 D LAP point exhibiting an inset which is a function of the addition power ranging from approximately 2.0 mm for addition powers of 1.00 D and below, to approximately 0.5 mm for addition powers of approximately 2.50 D and above;

a second segment from the 0.50 D LAP point to the HRP;

the position of the HRP being located at (2, $y_{FC}$−11) for addition powers up to 2.50 D and ranging to (2, $y_{FC}$−13) for addition powers of approximately 3.00 D and above;

a third segment from the HRP to near vision measurement point (NMP), located at approximately (x, $y_{FC}$−16);

wherein the x coordinate is approximately 2 mm for addition powers less than or equal to approximately 2.50 D, and is inset by an amount determined by the reciprocal of the addition power for addition powers greater than 2.50 D;

the slope of the power progression within the third segment varying from steeper than in the second segment for low addition power through generally equal to that within the second segment at medium addition powers, to relatively shallow at high addition powers.

37. A progressive opthalmatic lens element series according to claim 36, wherein the power progression includes a fourth segment from the NMP to the maximum addition power (MAP) point, at approximately (x, $y_{FC}$−18.5);

wherein the x coordinate is approximately 2 mm for addition powers less than or equal to approximately 2.50 D, and is inset by an amount determined by the reciprocal of the addition power for addition powers greater than 2.50 D.

38. A progressive opthalmatic lens element series according to claim 37, wherein the value of the Reading Contour P. varies with addition power.

39. A progressive opthalmatic lens element series according to claim 38, wherein the relationship between the value of the Reading Contour and addition power is given by the formula $$P_r = A - \alpha(2.5-A)$$

$$\text{where } \alpha = \exp\left[-\frac{(A-2.5)^2}{1.575}\right]$$

up to addition powers of 2.00 D.

40. A progressive opthalmatic lens element series according to claim 39, wherein, for addition powers above 2.00 D, the Reading Contour varies such that the difference between the power of the NMP and the HRP gradually increases up to 1.00 D for a 3.50 D addition power.

* * * * *